(12) United States Patent
Haimer

(10) Patent No.: US 9,956,621 B2
(45) Date of Patent: May 1, 2018

(54) TOOL HOLDING DEVICE

(71) Applicant: Franz Haimer Maschinenbau KG, Hollenbach (DE)

(72) Inventor: Franz Haimer, Hollenbach (DE)

(73) Assignee: Franz Haimer Maschinenbau KG, Hollenbach (DE)

( * ) Notice: Subject to any disclaimer, the term of this patent is extended or adjusted under 35 U.S.C. 154(b) by 0 days. days.

(21) Appl. No.: 15/357,970

(22) Filed: Nov. 21, 2016

(65) Prior Publication Data

US 2017/0072475 A1    Mar. 16, 2017

Related U.S. Application Data

(63) Continuation-in-part of application No. 13/061,377, filed as application No. PCT/EP2009/005982 on Aug. 18, 2009, now abandoned.

(30) Foreign Application Priority Data

Aug. 29, 2008  (DE) ........................ 10 2008 044 996

(51) Int. Cl.
*B23B 31/117* (2006.01)
*B23B 31/00* (2006.01)

(52) U.S. Cl.
CPC ........ *B23B 31/001* (2013.01); *B23B 31/1179* (2013.01); *B23B 2231/24* (2013.01);
(Continued)

(58) Field of Classification Search
CPC ... B23B 31/02; B23B 31/1179; B23B 31/001; B23B 2231/24; B23B 2231/28;
(Continued)

(56) References Cited

U.S. PATENT DOCUMENTS 4,204,787 A   5/1980  McCray et al.
5,311,654 A   5/1994  Cook
(Continued)

FOREIGN PATENT DOCUMENTS

DE    4326023 A1    3/1994
DE    4322552 A1    1/1995
(Continued)

*Primary Examiner* — Eric A Gates
*Assistant Examiner* — Chwen-Wei Su

(57) ABSTRACT

The invention relates to a tool holding device comprising a tool holding body for securing, in a fixed manner, a rotary tool comprising a shaft, provided with a clamping section and a receiving opening for the shall of the tool, a coolant feeding device for pressurized fluid, at least one coolant guiding device for guiding the coolant into a clamped tool shaft. The coolant guiding device is designed as at least one flat groove on an inner side of the receiving opening, joining to the front side on a free end of the tool holding body and directly adjacent to the tool shaft in the surroundings of the tool holding device or a coolant storing chamber and or collecting chamber is provided in the region of the free end of the tool holding body, to which the at least one coolant guiding device joins. The coolant storing chamber and or collecting chamber is connected by means of an annular gap to the surroundings of the tool holder device. The coolant storing chamber and/or collecting chamber and the annular gap are defined at least partially by the work shaft.

11 Claims, 19 Drawing Sheets

(52) U.S. Cl.
CPC ....... *B23B 2231/28* (2013.01); *B23B 2240/04* (2013.01); *B23B 2250/12* (2013.01); *Y10T 279/17111* (2015.01); *Y10T 279/17957* (2015.01); *Y10T 279/3493* (2015.01); *Y10T 408/44* (2015.01); *Y10T 409/303976* (2015.01)

(58) Field of Classification Search
CPC ............. B23B 2250/12; B23B 2240/04; Y10T 279/17111; Y10T 279/3493; Y10T 279/17957; Y10T 408/44; Y10T 409/304032; Y10T 409/303976; Y10T 409/30952

See application file for complete search history.

(56) References Cited

U.S. PATENT DOCUMENTS

| | | | |
|---|---|---|---|
| 5,358,360 | A | 10/1994 | Mai |
| 5,975,817 | A | 11/1999 | Komine |
| 6,394,466 | B1 | 5/2002 | Matsumoto et al. |
| 6,729,627 | B2 | 5/2004 | Komine et al. |
| 7,785,046 | B2 | 8/2010 | Beckington |
| 7,966,916 | B2 * | 6/2011 | Matsunaga ......... B23B 31/4073 82/152 |
| 8,403,338 | B2 * | 3/2013 | Hangleiter ............ B23B 31/265 279/35 |
| 2002/0145260 | A1 | 10/2002 | Komine et al. |
| 2005/0029423 | A1 | 2/2005 | Vlismas |
| 2005/0169718 | A1 | 8/2005 | Beckington |
| 2007/0167119 | A1 | 7/2007 | Momosaki |
| 2007/0226985 | A1 | 10/2007 | Paton et al. |

FOREIGN PATENT DOCUMENTS

| | | | |
|---|---|---|---|
| DE | 19632974 | A1 | 2/1998 |
| DE | 19654010 | A1 | 7/1998 |
| DE | 20008077 | U1 | 9/2000 |
| DE | 69331325 | T2 | 8/2002 |
| DE | 19832793 | A1 | 10/2007 |
| EP | 0618030 | A1 | 10/1994 |
| EP | 1074322 | A1 | 2/2001 |
| EP | 1084782 | A1 | 3/2001 |
| FR | 2239849 | A | 2/1975 |
| GB | 2401335 | A | 11/2004 |
| JP | 368766 | | 7/1991 |
| JP | H06-061435 | U | 8/1994 |
| JP | H06-063207 | U | 9/1994 |
| JP | 717407 | | 3/1995 |
| JP | 8099245 | A | 4/1996 |
| JP | H08090318 | A | 4/1996 |
| JP | 10225814 | | 8/1998 |
| JP | H11179632 | A | 7/1999 |
| JP | 2000015539 | A | 1/2000 |
| JP | 2000246585 | A | 9/2000 |
| JP | 2003266274 | A * | 9/2003 |
| JP | 2007130694 | A | 5/2007 |

* cited by examiner

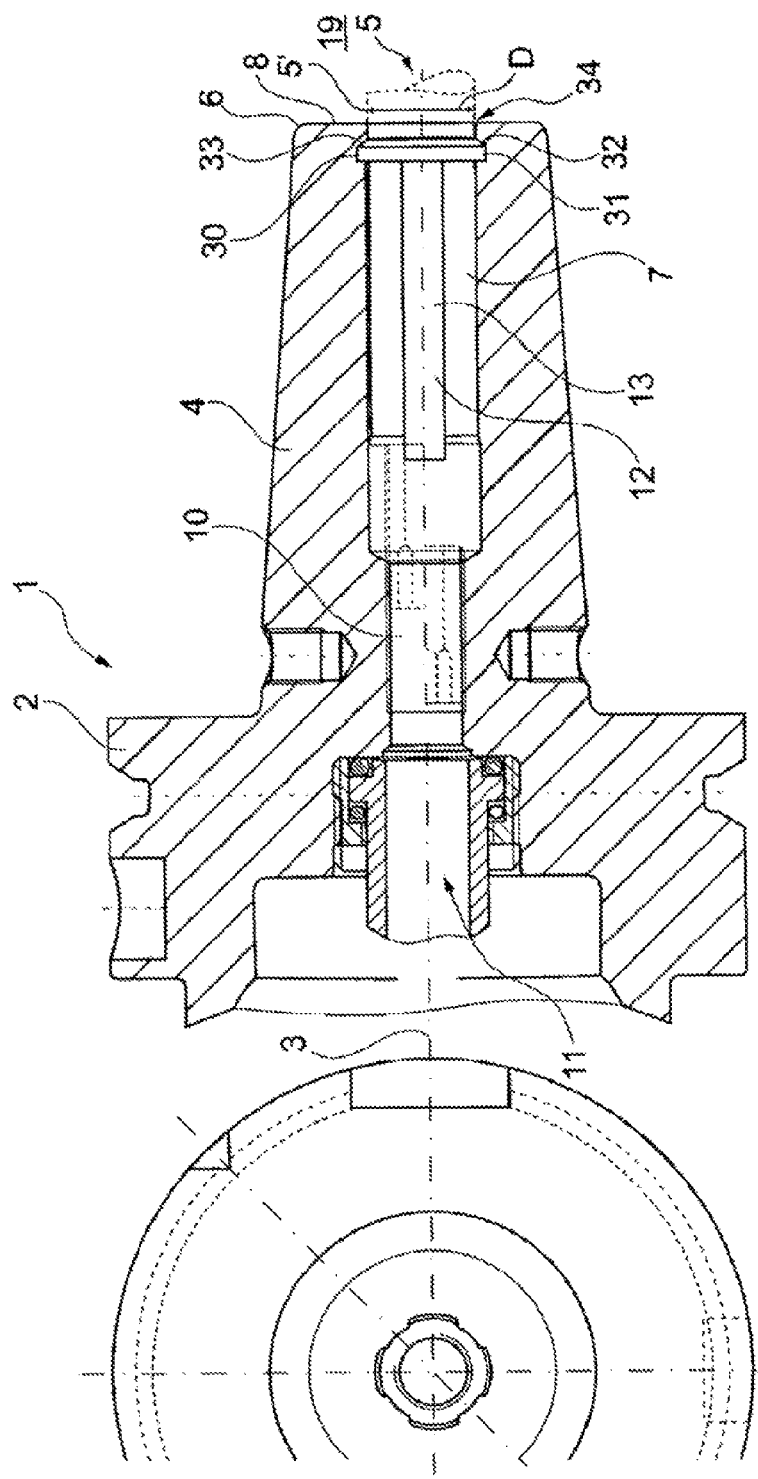

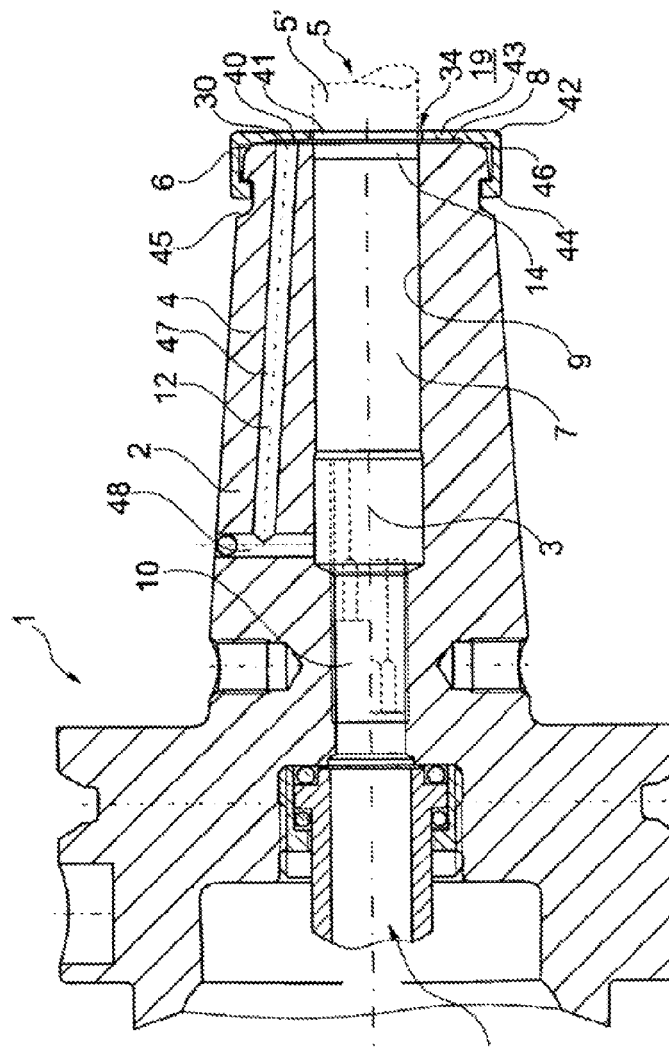
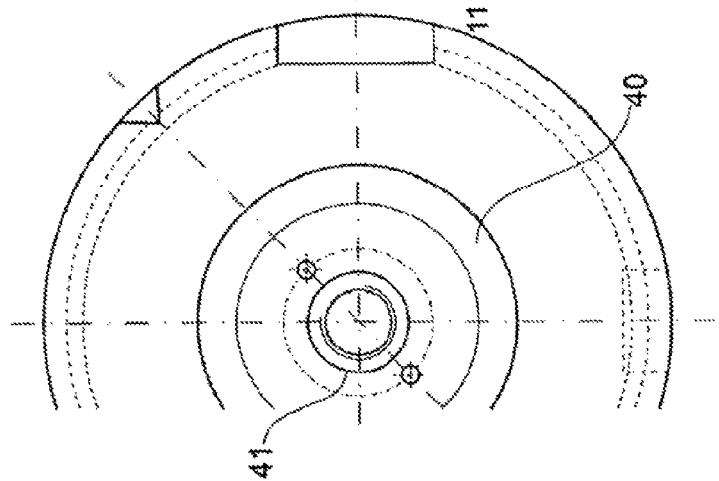
Fig. 9
Fig. 9a

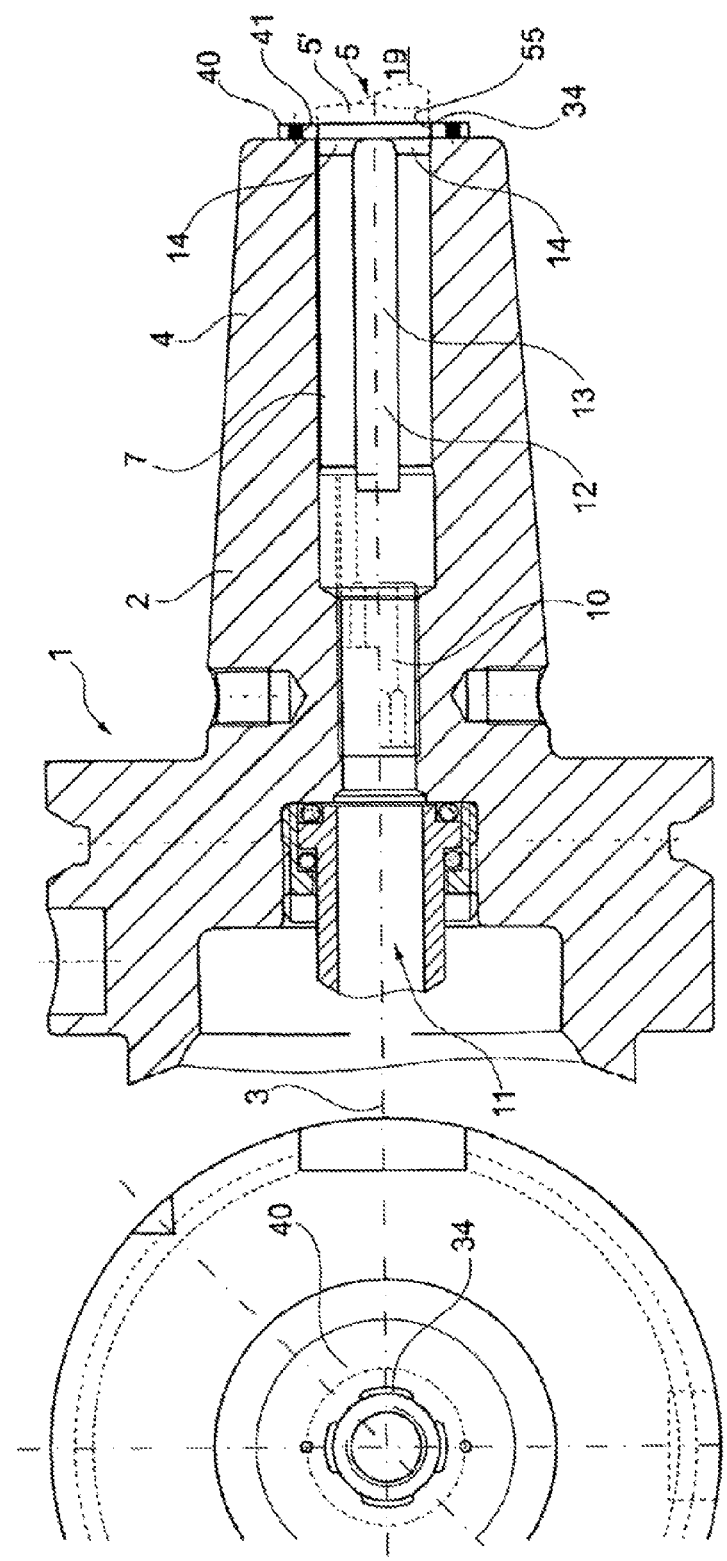

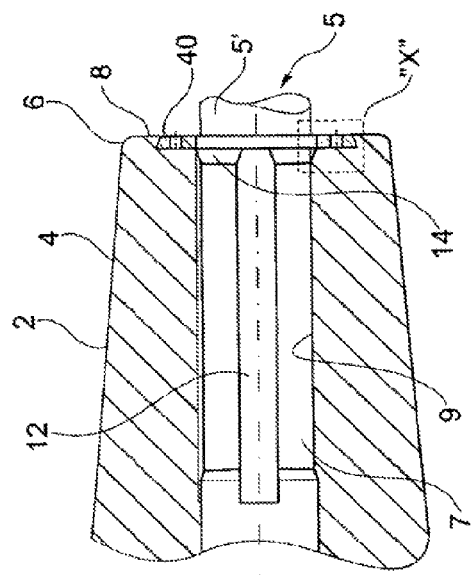
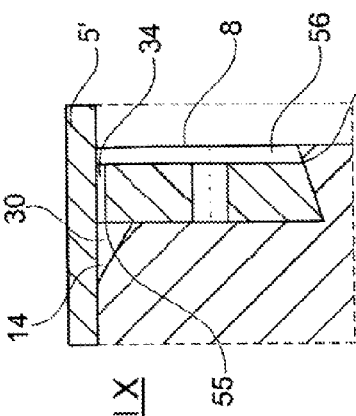
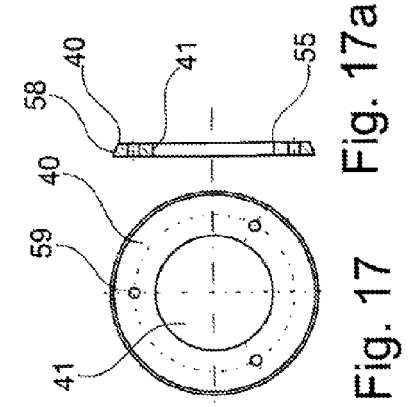
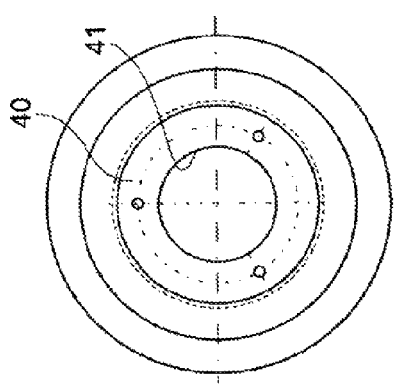

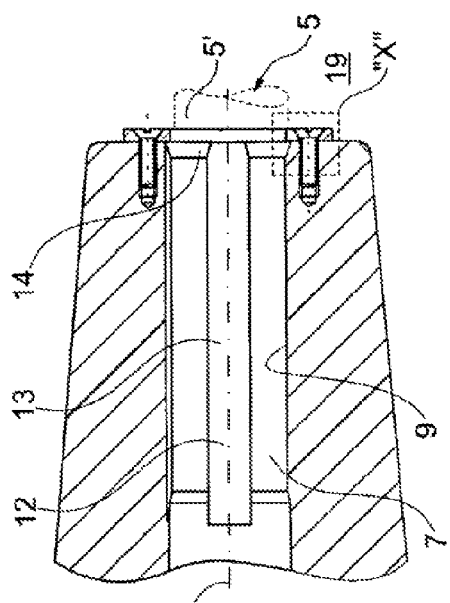
Fig. 18
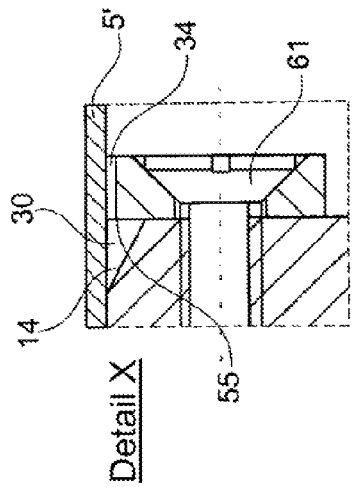
Fig. 18b
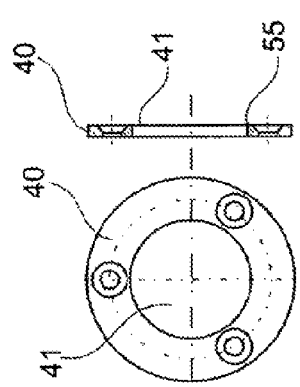
Fig. 19a
Fig. 19
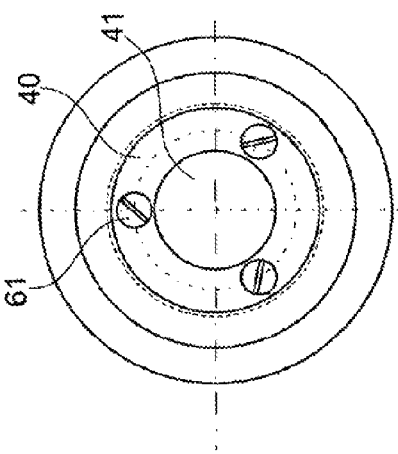
Fig. 18a

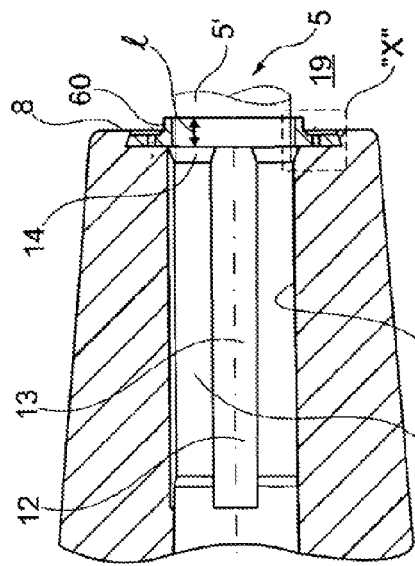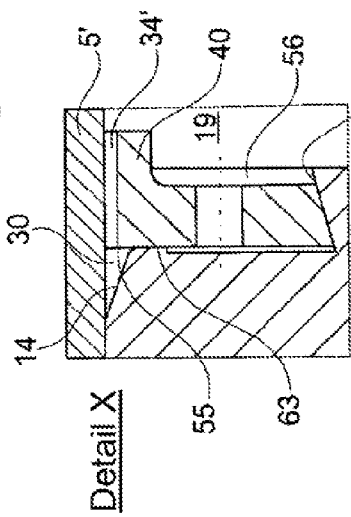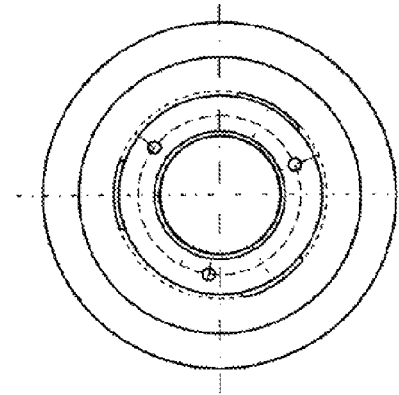

TOOL HOLDING DEVICE

FIELD OF THE INVENTION

The invention relates to a tool holding device. In particular, the invention relates to a tool holding device for tools with a shank, e.g. a shrink fit chuck, or embodied in the form of a flat chuck such as a Weldon chuck or whistle-notch chuck, as well as in the form of a collet chuck such as an ER collet chuck, an OZ collet chuck, or a high-precision collet chuck.

BACKGROUND OF THE INVENTION

EP 1 074 322 A1 has disclosed a rotating chuck that is embodied in the form of a shrink fit chuck for a tool, in particular for a drill bit or milling bit. This rotating chuck has a coolant supply conduit. The shrink fit chuck has a receiving bore for the tool in which the tool is secured by means of a shrink fit seat during operation. The receiving bore has a number of axially extending longitudinal grooves distributed around its inner circumference, which are connected to the supply conduit for a coolant. The grooves extend to the free end of the shrink fit chuck and feed into the open air there. In terms of their cross-section, the grooves are embodied as narrow grooves. In a shrink lit chuck of this kind, it has been observed that particularly at high rotation speeds that occur during operation of the chuck and particularly with small tool diameters, the jet of coolant emerging from the end separates from the tool and a reliable supply of coolant to the cutting region is not always guaranteed, particularly with longer tools. Due to this narrow embodiment of the grooves, the coolant emerges in the form of three separate jets. This, too, does not always guarantee a reliable cooling of the tool in the cutting region/material-removing region.

DE 198 32 793 134 has disclosed a tool holding device embodied in the form of a collet in which the coolant is conveyed on the inside of the tool holding device, through slots of the collet, past the tool shank, to the free front end of the tool holding device. A covering cap with an insert rests against this free front end; the insert forms an annular gap through which the coolant can travel out into the open air from the inside of the tool holding device.

The exit of the coolant into the open air here occurs in a relatively indefinite fashion and cannot always guarantee a clean guidance of the coolant jet along the tool. In addition, a tool holding device according to DE 198 32 793 B4 requires a significant coolant flow rate, which in turn requires coolant pumps with high pumping capacities.

DE 693 31 325 T2 has disclosed a tool holding system embodied in the form of a shrink fit chuck in which a receiving opening, for a cylindrical tool is provided with longitudinal grooves through which the coolant can be conveyed. The longitudinal grooves are cross-sectionally embodied in the form of narrow moves with a rounded groove bottom.

FR 22 39 849 has disclosed a tool holding device in which a receiving opening for a tool is likewise provided with longitudinal grooves through which a coolant can be conveyed. The grooves are cross-sectionally embodied in the form of narrow grooves with a square groove bottom. As a result, the coolant emerges into the open air in the form of bundled jets. This is not desirable.

The object of the present invention, therefore, is to disclose a tool holding device, in particular a tool holding device embodied in the form of a shrink fit chuck, in which the coolant guidance inside the tool holding device is optimized and in particular when the coolant emerges from the tool holding device, a coolant envelope that is closed or essentially closed in the circumference direction around a rotating tool can be formed, which rests against the tool and/or the tool shank. In particular, measures should be disclosed that make it possible to guide the closed or essentially closed coolant envelope around the rotating tool as close to the tool as possible, i.e. in as bundled a fashion as possible, even at high rotation speeds when it is subject to centrifugal forces, and to minimize or prevent a mushrooming, or dispersing of the coolant envelope around the tool. The coolant can be embodied in the form of all types of fluids, in particular a liquid, a gas, or a gas/oil mixture (oil mist).

Another object of the invention is to ensure the most efficient possible cooling defined at the locations in which the material-removing machining is occurring with the lowest possible volumetric flow rate of coolant.

Another object of the invention is to disclose a tool holding device that enables coolant to emerge from the device with no tangential velocity, with almost no tangential velocity, or with at least reduced tangential velocity at a predetermined operating rotation speed.

Another object of the invention is to provide a closed coolant envelope around the machining tool (rotating tool) with a satisfactory jet guidance, without having to accept excessive limitations with regard to the maximum usable tool length.

SUMMARY OF THE INVENTION

The invention improves on a generic tool holding device in that: the coolant conveying device is embodied in the form of at least one flat groove that is situated on an inner surface of the receiving opening and feeds into a region surrounding the tool holding device at a free end of the tool holding body, i.e. at the front end immediately adjacent tool to tool shank; and/or the region of the free end of the tool holding body is provided with a coolant reservoir and/or coolant collecting chamber into which at least one coolant conveying device feeds; the coolant reservoir and/or coolant collecting chamber is connected via an annular gap to the region surrounding the tool holding device; and the annular gap and coolant reservoir and/or coolant collecting chamber are at least partially delimited by the tool shank. It is thus possible to form a closed or essentially closed coolant envelope, which completely or almost completely encloses the tool shank or tool at the outlet, i.e. in the region of the front end of the tool holder. The provision of flat grooves as defined by the invention, which are at least wider than they are deep, forms a particularly thin-filmed, fanned-out coolant jet; it has been observed that fanned-out, thinner coolant jets have a greater tendency to at least partially unite into a closed coolant envelope against the tool shank or tool, outside the tool holder. Observations have also demonstrated that an embodiment of the coolant jet that is relatively thin in the radial direction reduces the tendency of the coolant to separate from the rotating tool, thus reducing the mushrooming of the coolant envelope. Particularly at high rotating speeds and the resulting high centrifugal forces, this helps to produce a thin, closed coolant envelope.

According to a particular embodiment of the invention, the cross-section of the flat grooves has a greater width b than depth t. In particular, it turns out to be advantageous for the ratio of groove width b to groove depth t of the flat grooves to be greater than 1:1 and up to a maximum of 25:1;

it ought to be particularly useful for this ratio to lie in the range between 2:1 and 15:1. A range between 2:1 and 10:1 is particularly preferable.

The above-mentioned ratio ranges strike a good compromise between the available cross-sectional area for the coolant fluid to flow through and a remaining residual inner surface of the receiving bore so that there is sufficient available clamping area to hold the tool.

It is particularly preferable to provide the flat grooves with a groove bottom having a cylindrical segment surface that is curved concentric to an axial longitudinal central axis of the tool holding device. This forms ring segment-like exit gaps at the free end of the tool holding body, which are particularly able to converge a preshaping of coolant jets to the diameter of the tool. It turns out to be advantageous to distribute the flat grooves unevenly around the circumference in the circumference direction of the receiving bore. This reduces the excitation of vibrations in the clamped tool. The excitation of vibrations occurs due to the alternation of regions of different rigidity (clamping surface-groove). With an asymmetrical distribution of grooves or with different widths of the grooves, the inevitable excitation of vibrations occurs in an irregular fashion.

The same effect can be achieved if the flat grooves of a tool holding device have different widths b.

It has also turned out to be advantageous for the depth t of the flat grooves to be approximately 0.5% to 15%, in particular 1% to 10% of the tool diameter D. This makes it possible to strike a good compromise between the required coolant quantity and the thinness of the emerging coolant jet desired according to the invention.

An acceleration of the coolant toward the free end of the tool holding body can be achieved in a suitable fashion if the groove depth t of the flat grooves decreases conically from a maximum depth $t_{max}$ to a minimum depth $t_{min}$ in the direction toward the free end of the tool holding body. Preferably, the depth $t_{min}$ is approximately one quarter to two thirds the initial maximum depth $t_{max}$.

A particularly favorable jet formation can be achieved if the flat grooves, at least in the end region, are embodied so that their width b expands, in particular conically, in the direction toward the free end of the tool holding device along the axial longitudinal central axis. This measure contributes to ensuring a secure hold of the tool in the tool holding opening and to fulfilling the desired requirements with respect to the jet quality of the emerging coolant. In particular, this facilitates the formation of a coolant envelope that is closed in the circumference direction.

Another variant of the groove-routing of the flat grooves inside the receiving opening is to embody them as coiled helical fashion; in particular, a helical coiling oriented in the opposite direction from the tool's working rotation direction has the advantage that the emerging cooling fluid is given a tangential velocity component oriented in opposition to the tangential velocity of the tool in the circumference direction. It is consequently possible to achieve an improved jet forming quality.

It also turns out to be useful to provide a reservoir and/or collecting chamber for coolant inside or outside the tool holding body; through an annular gap or jet-forming gap that surrounds the tool shank, the coolant from the reservoir and/or collecting chamber can emerge in the form of a completely closed coolant envelope.

Other advantageous embodiments are disclosed and ensue from the following description of individual exemplary embodiments.

The invention will be described in greater detail below by way of example in conjunction with the drawings.

BRIEF DESCRIPTION OF THE DRAWINGS

FIG. 1a shows a tool holding device according to FIG. 1 in a top view of its front end oriented toward the insert tool.

FIG. 2a shows a tool holding device according to FIG. 2 in a top view of its front end oriented toward the insert tool.

FIG. 3a shows a tool holding device according to FIG. 3 in a top view of its front end oriented toward the insert tool.

FIG. 4a shows a tool holding device according to FIG. 4 in a top view of its front end oriented toward the insert tool.

FIG. 5a shows a tool holding, device according to FIG. 5 in a top view of its front end oriented toward the insert tool.

FIG. 8 is a partial longitudinal section through an eighth embodiment of the tool holding device according to the invention, embodied in the form of a shrink fit chuck.

FIG. 8a shows a tool holding device according to FIG. 8 in a top view of its front end oriented toward the insert tool.

FIG. 9 is a partial longitudinal section through a ninth embodiment of the tool holding device according to the invention, embodied in the form of a shrink fit chuck.

FIG. 9a shows a tool holding device according to FIG. 9 in a top view of its front end oriented toward the insert tool.

FIG. 15 is a partial longitudinal section through a fifteenth embodiment of the tool holding device according to the invention, embodied in the form of a shrink fit chuck.

FIG. 15a shows a tool holding device according to FIG. 15 in a top view of its front end oriented toward the insert tool.

FIG. 16 is a partial longitudinal section through a sixteenth embodiment of the tool holding device according to the invention, embodied in the form of a shrink fit chuck.

FIG. 16a shows a tool holding device according to FIG. 16 in a top view of its front end oriented toward the insert tool.

FIG. 16b is a detail view of a detail "X" according to FIG. 16.

FIG. 17 is a top view of an insert piece/insert (cap element) of the embodiment according to FIG. 16.

FIG. 17a is a cross-sectional view of the insert piece/insert (cap element) according to FIG. 17.

FIG. 18 is a partial longitudinal section through an eighteenth embodiment of the tool holding device according to the invention, embodied in the form of a shrink fit chuck.

FIG. 18a shows a tool holding device according to FIG. 18 in a top view of its front end oriented toward the insert tool.

FIG. 18b is a detail view of a detail "X" according to FIG. 18.

FIG. 19 is a top view of a detail of the embodiment from FIG. 18.

FIG. 19a is a cross-sectional view of the detail from FIG. 19.

FIG. 20 is a partial longitudinal section through a twentieth embodiment of the tool holding device according to the invention, embodied in the form of a shrink fit chuck.

FIG. 20a shows tool holding device according to FIG. 20 in a top view of its front end oriented toward the insert tool.

FIG. 20b is a detail view of a detail according to FIG. 20.

FIG. 21 is a top view of a detail of the embodiment from FIG. 20.

FIG. 21a is a cross-sectional view of the detail from FIG. 20.

DETAILED DESCRIPTION OF THE PREFERRED EMBODIMENTS

Figure 1:
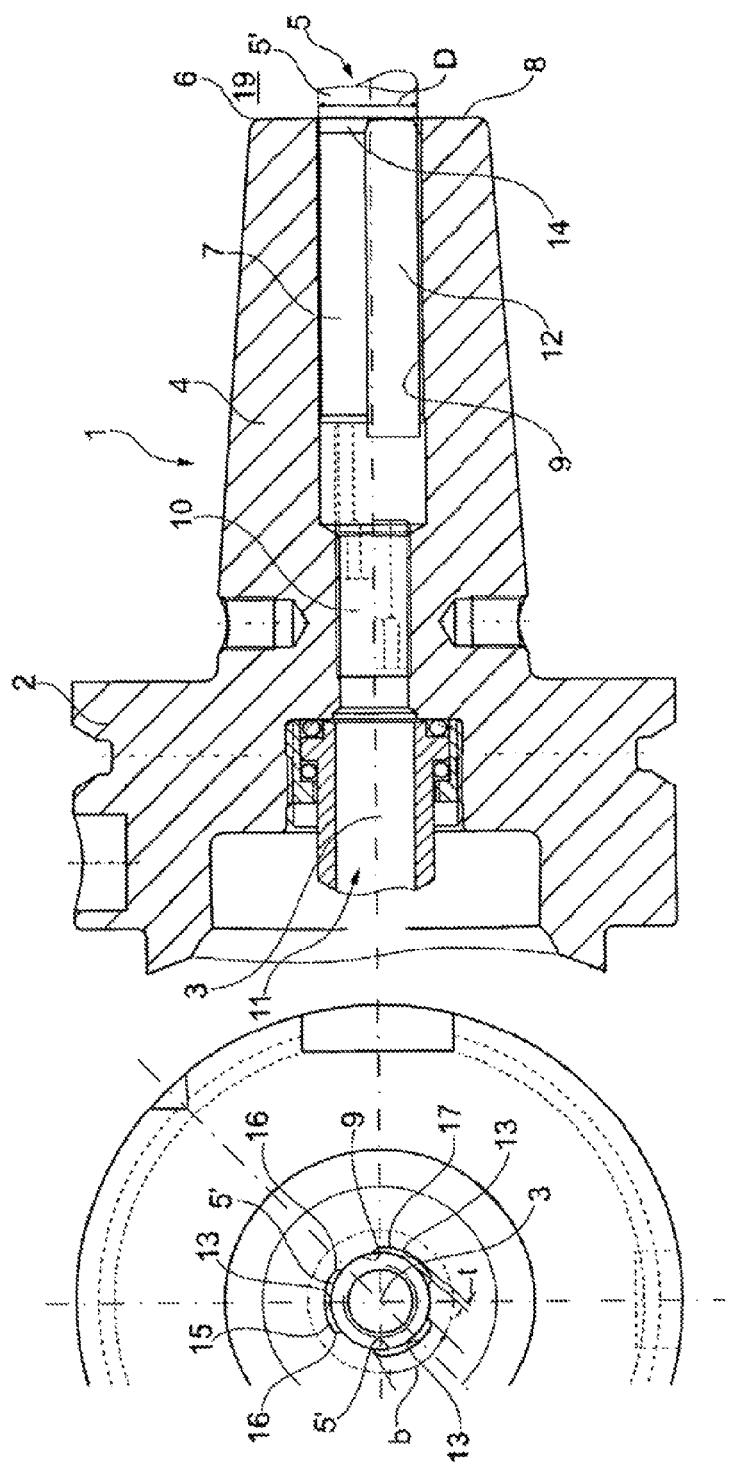
FIG. 1 is a partial longitudinal section through a first embodiment of the tool holding device according to the invention, embodied in the form of a shrink fit chuck.

The invention is disclosed below in conjunction with various exemplary embodiments of tool holding devices embodied in the form of a shrink fit chuck. Naturally, a person of average skill in the art can easily transfer the details disclosed to tool holding devices embodied in the form of Weldon chucks or whistle-notch chucks. The same is true for tool holding devices embodied in the form of collet chucks such as ER collet chucks, OZ collet chucks, and/or high-precision collet chucks.

A first embodiment of a tool holding device 1 according to the invention (FIGS. 1 and 1a) has a tool holding body 2 with an axial longitudinal central axis 3 around which the tool holding body 2 is embodied as essentially rotationally symmetrical. The tool holding body 2 has a clamping section 4 for accommodating a tool/rotating tool 5. The tool 5 has a tool shank 5' and this shank 5' can be inserted into the receiving opening 7 from the free end 6 of the tool holding body 2. The tool shank 5 has a nominal diameter D. In the exemplary embodiments described here, the clamping section 4 is embodied in the form of a shrink fit section, which holds the tool 5 by means of a shrinkage pressure. The clamping section 4 has a receiving opening 7 extending in from its free end 6. The receiving opening 7 is essentially embodied in the form of a receiving bore, with the axial longitudinal central axis 3 as the central axis of the bore, and extends axially a short way into the tool holding body 2 from a front end 8 of the clamping section 4. The receiving opening 7 has an inner surface 9 that functions as a clamping surface for the tool 5 that is to be held. The receiving opening 7 extends in the axial direction of the tool holding body 2 through the clamping section 4 and feeds into a central transition bore 10, which in turn, as it extends on in the axial direction, communicates with a coolant supply device 11. This forms a flow conduit for coolant fluid, which extends approximately centrally through the middle of the tool holding body 2. Consequently, the pressurized coolant fluid supplied by the coolant supply device 11 can travel through the transition bore 10 and the receiving opening 7 to the free end 6 of the tool holding body. In the region of the clamping section 4, coolant conveying devices 12 in the form of flat grooves 13 are provided, which, together with the tool 5 that is clamped, in the receiving opening 7, form flow conduits for coolant along the tool shank 5' inside the clamping section 4. The flat grooves 13 extend in the axial direction through the clamping section 4 to the free end 6 of the tool holding body 2. In the region of the free end 6 of the receiving opening 7, an internal bevel 14 is provided. Due to the presence of the internal bevel 14, the receiving opening 7 expands conically in the region of the free end 6 of the tool holding body 2.

In the example shown in FIGS. 1 and 1a, three flat grooves 13 are positioned so that they are distributed uniformly around the circumference of the receiving opening 7. The flat grooves 13 have a groove bottom 15 and respective groove side wall sections 16. The groove bottom 15 of the flat grooves 13 is embodied with a curved cross-section and particularly preferably, has the three-dimensional shape of a cylindrical surface segment. The cylindrical segment surface here is embodied as concentric to the axial longitudinal central axis 3.

The flat grooves 13 have groove depth t and a groove width b. According to invention, the width b of the flat grooves 13 is selected to be greater than the depth t of the flat grooves and in a particularly preferable embodiment, is significantly greater than the depth t. The ratio of the groove width b to groove depth t of the flat grooves is greater than 1:1 and up to a maximum of 25:1. A preferred range for this ratio is the range between 2:1 and 15:1. A ratio range between 2:1 and 10:1 is particularly preferable. The depth t of the flat grooves 13 is 0.5% to 15%, in particular 1% to 10% of the tool diameter D.

A transition between the groove bottom 15 and the groove side wall sections 16 is embodied as rounded, which facilitates a precise, clean jet guidance.

The flat grooves 13, together with an inserted tool 5, each form an annular gap segment 17 in cross-section. Coolant can travel through this annular gap segment 17 in the region of the free end 6 of the tool holding body 2 and can emerge into the open, lying directly against the shank of the tool 5.

By contrast with the depiction according to FIGS. 1 and 1a, the flat grooves 13 can also be distributed unevenly around the circumference of the inner surface 9 of the receiving opening 7. This produces different-sized areas for the sections of the inner surface 9 functioning as clamping surfaces. Observations have shown that during operation, the clamped tool 5 experiences a lower excitation of vibrations if the alternation between clamping surfaces and flat grooves 13 occurs irregularly. Particularly at high rotation speeds of the tool 5, this proves to be a significant advantage and increases the quality of the material-removing machining. An additional measure for reducing the excitation of vibrations in the tool 5 is to embody the flat grooves 13 with different widths b so that some flat grooves 13 are wider and some are less wide.

An essential feature of the invention at any rate is the fact that the flat grooves 13 are wider than they are deep so that a jet that is as thin as possible in the radial direction and as wide as possible in the tangential direction is formed at the exit in the region of the front end 8. Such a thin, wide jet adheres to the tool better, even at high rotation speeds, and conforms to its shape better. This also significantly reduces atomization and mushrooming of the jet, even at high rotation speeds so that even with a longer tool 5, coolant can be conveyed reliably to the cutting region of the tool 5.

In a preferred embodiment, the depth t of the flat grooves 13 is matched to the internal bevel 14 in such a way that the larger diameter of the internal bevel 14 oriented toward the front end 8 is greater than the nominal diameter of the receiving opening 7 by approximately twice the depth t. As a result, the flat grooves 13 come to an end smoothly, directly at the front end 8 in the longitudinal direction of the tool holding, device 2. This produces a particularly good jet guidance and jet formation and reduces atomization of the jet after it exits from the tool holding body 2.

Figure 2:
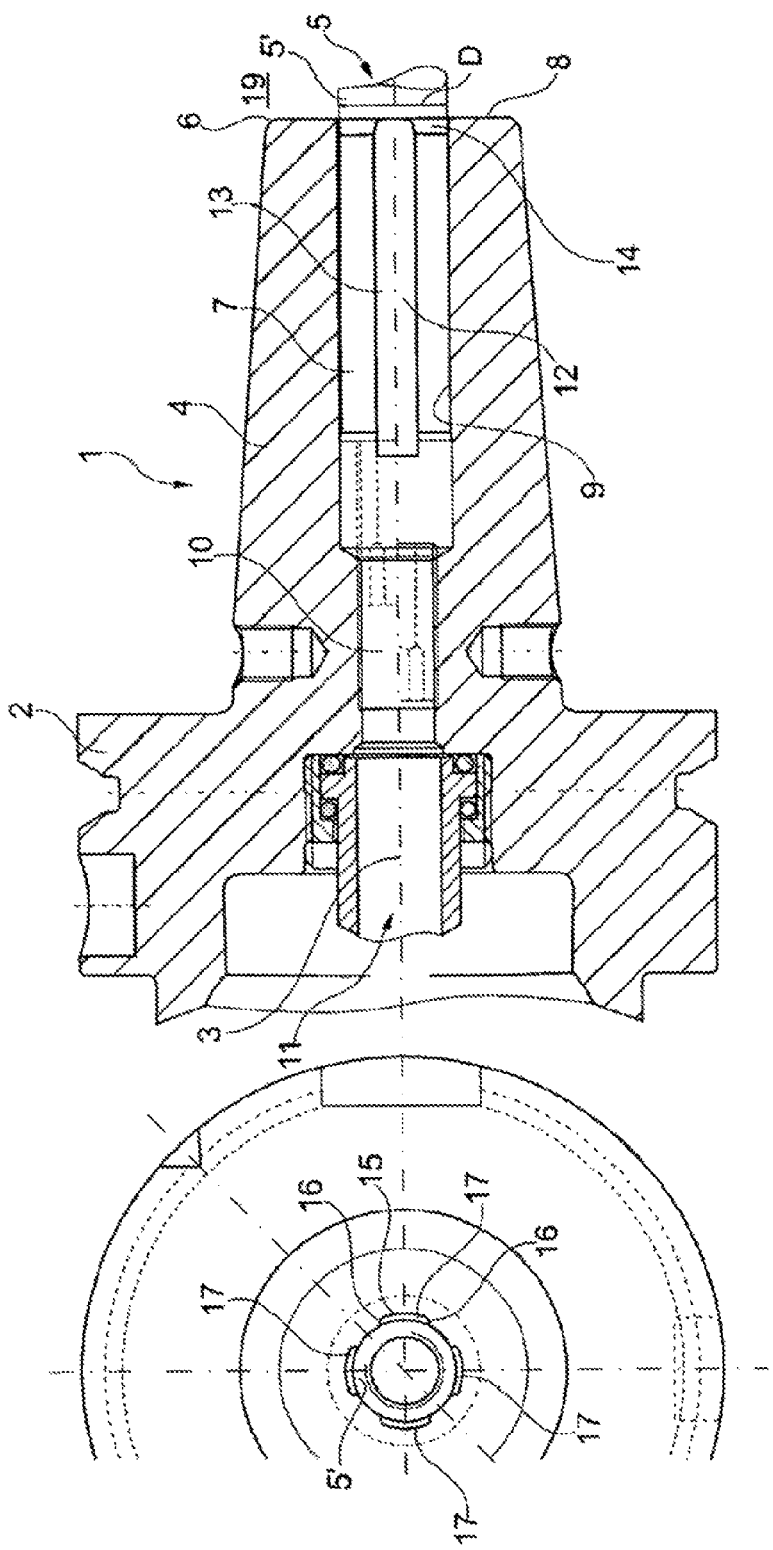
FIG. 2 is a partial longitudinal section through a second embodiment of the tool holding device according to the invention, embodied in the form of a shrink fit chuck.

FIGS. 2 and 2*a* show a second exemplary embodiment of the tool holding device 1. This embodiment of the tool holding device 1 according to the invention corresponds essentially to the embodiment according to FIGS. 1 and 1*a*; elements that are the same have therefore been provided with the same reference numerals. The embodiment according to FIGS. 2 and 2*a* differs only in the number of flat grooves 13 that are distributed around the circumference of the inner surface 9. In the present example according to FIGS. 2 and 2*a*, four flat grooves are depicted. The remaining features and functions of the tool holding device described in connection with FIGS. 1 and 1*a* naturally also apply to the exemplary monument according to FIGS. 2 and 2*a*.

Figure 3:
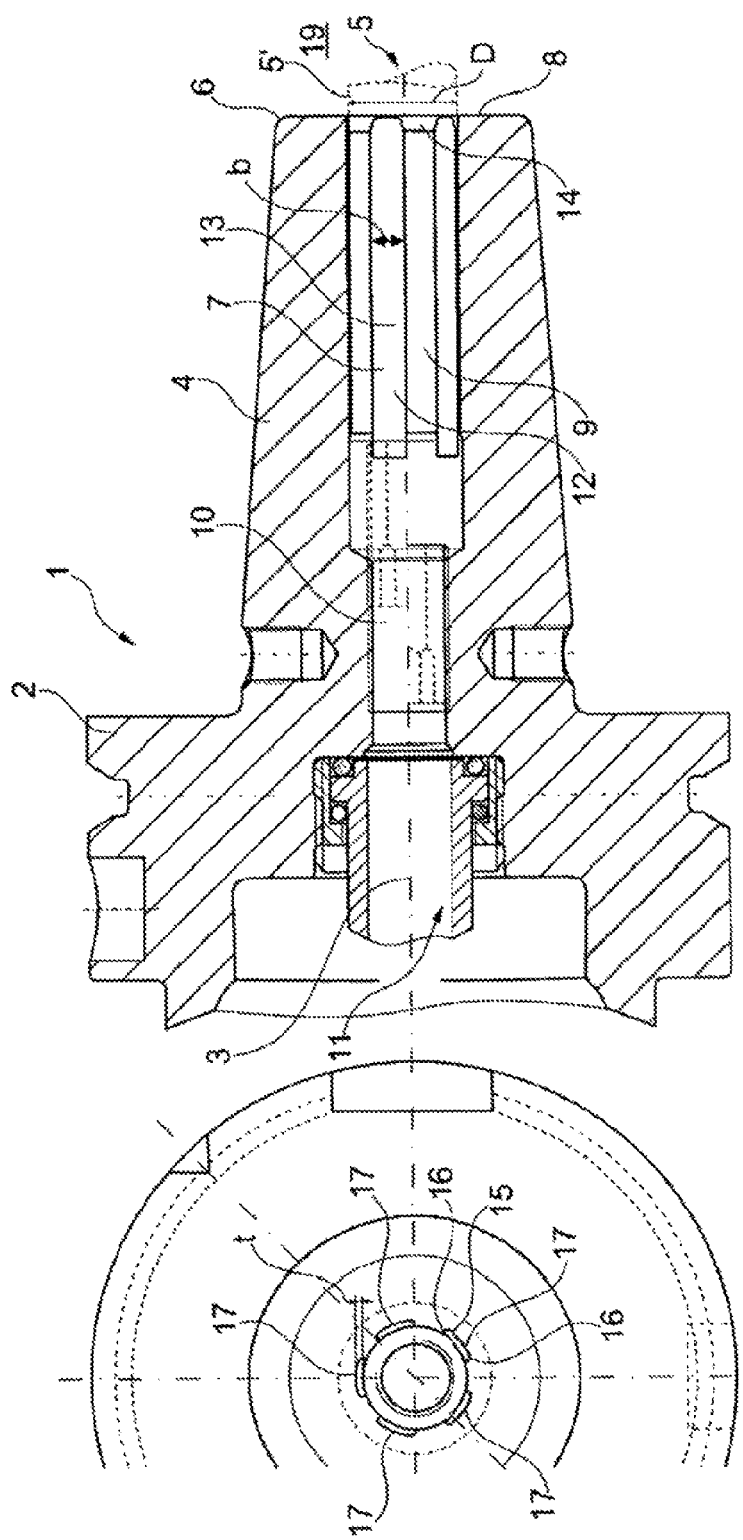
FIG. 3 is a partial longitudinal section through a third embodiment of the tool holding device according to the invention, embodied in the form of a shrink fit chuck.

FIGS. 3 and 3*a* show another exemplary embodiment of the tool holding device 1 according to the invention. This embodiment of the tool holding device 1 according to the invention corresponds essentially to the embodiment according to FIGS. 1 and 1*a*; elements that are the same have therefore been provided with the same reference numerals. The embodiment according to FIGS. 3 and 3*a* differs only in the number of flat grooves 13 that are distributed around the circumference of the inner surface 9. In the present example according to FIGS. 3 and 3*a*, five flat grooves are depicted. The remaining features and functions of the tool holding device 1 described in connection with FIGS. 1 and 1*a* naturally also apply to the exemplary monument according to FIGS. 3 and 3*a*.

Figure 4:
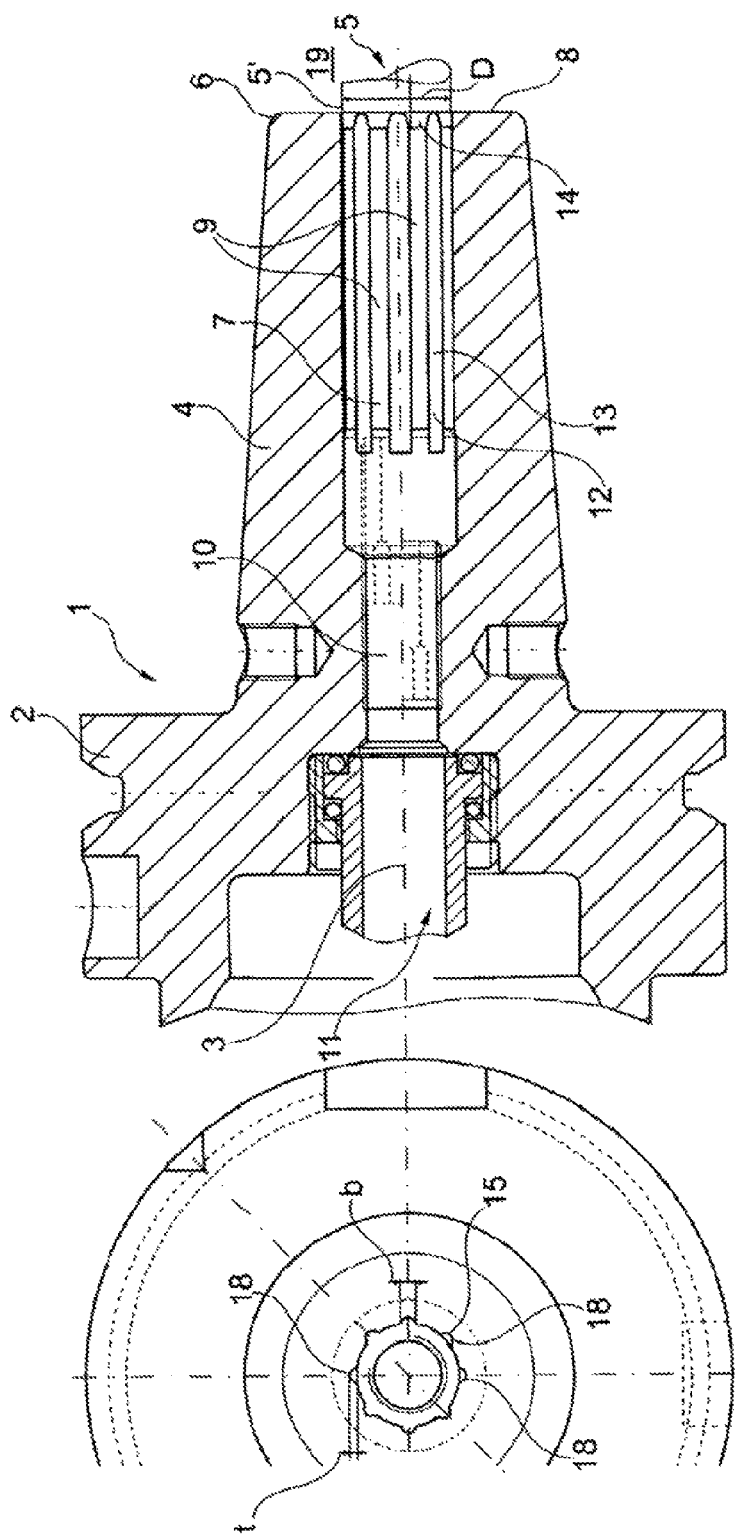
FIG. 4 is a partial longitudinal section through a fourth embodiment of the tool holding device according to the invention, embodied in the form of a shrink fit chuck.

FIGS. 4 and 4*a* show another exemplary embodiment of the tool holding device 1 according to the invention. This embodiment differs from the above-described embodiments only in the cross-sectional form of the flat grooves 13. In the exemplary embodiment according to FIGS. 4 and 4*a*, these flat grooves 13 are embodied as semicircular in cross-section. In this embodiment, the groove depth t is approximately half the groove width b. The flat grooves 13 in the embodiment illustrated in FIGS. 4 and 4*a* are thus flat grooves as defined by the invention, in which the groove depth t is less than the groove width b. The flat grooves 13 of this embodiment, together with the tool shank 5', form flow conduits 18 that are approximately semicircular in cross-section. Otherwise, the exemplary embodiment according to FIGS. 4 and 4*a* differs from the above-described embodiments in the number of flat grooves that are distributed around the circumference of the inner surface 9. In the present example, there are eight flat grooves 13.

Figure 5:
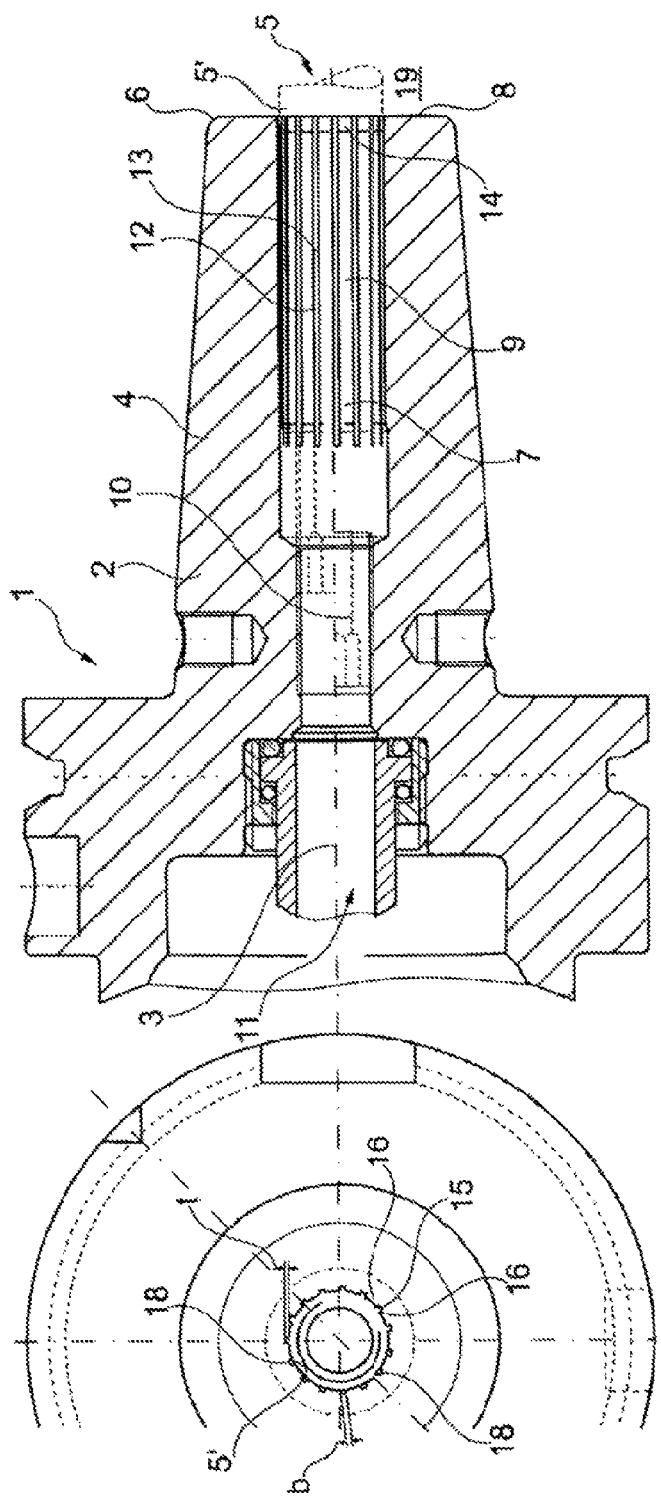
FIG. 5 is a partial longitudinal section through a fifth embodiment of the tool holding device according to the invention, embodied in the form of a shrink fit chuck.

According to another embodiment of the tool holding device 1 according to the invention (FIGS. 5 and 5*a*), a plurality of cross-sectionally rectangular flat grooves 13 is provided, in which the groove side wall sections 16 and the groove bottom 15 transition into one another with sharp edges. The width b of the flat grooves 13 is slightly greater than the depth t so that the exemplary embodiment according to FIGS. 5 and 5*a*, too, is equipped with flat grooves as defined by the invention. In this case, there are fifteen flat grooves 13. As a result, two adjacent flat grooves 13 are situated relatively close to each other. Consequently, a large number of coolant jets exit the tool holding body 2 directly adjacent to one another in the region of the front end 8. Due to the short distance between two adjacent coolant jets, two adjacent jets have been shown to unite outside the tool holding body 2, consequently forming an essentially closed coolant envelope around the shank of the tool 5.

In this embodiment, the flat grooves 13, together with the tool shank 5, form flow conduits 18 that are essentially rectangular in cross-section, in particular in the form of flat rectangles.

Figures 6, 6A:
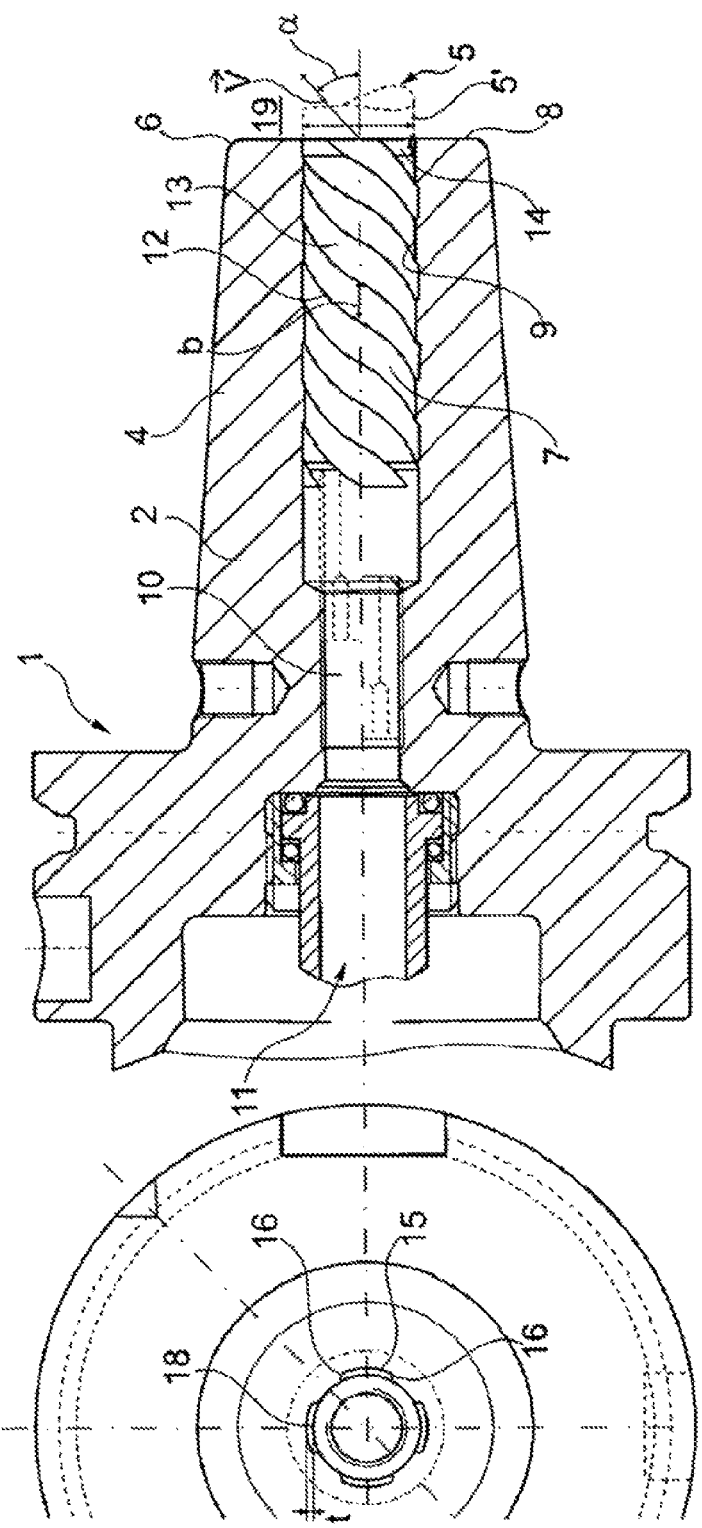
FIG. 6 is a partial longitudinal section through a sixth embodiment of the tool holding device according to the invention, embodied in the form of a shrink fit chuck.
FIG. 6a shows a tool holding device according to FIG. 6 in a top view of its front end oriented toward the insert tool.

Another embodiment of the tool holding device 1 according to the invention shown in FIGS. 6 and 6*a* corresponds essentially to the basic design of the embodiment according to FIGS. 2 and 2*a* and in this case, has four flat grooves 13 with curved groove bottoms 15. By contrast with the embodiment according to FIGS. 2 and 2*a*, the flat grooves 13 here are coiled in helical fashion along the inner surface 9 of the receiving opening 7. As a result, in a view from the side, a groove center axis encloses an angle α with the axial longitudinal central axis 3. Due to the helical curvature of the flat grooves 13 on the inside of the receiving opening 7, the pressurized coolant, which is conveyed along these helically coiled flat grooves to the free front end 8, exits the grooves with a velocity component $\overline{v}$. The helical coiling can be oriented in the same direction as a rotation of the tool 5 during operation and can also be oriented opposite the rotation direction of the tool during operation. In particular, the opposing orientation of the helical curvature of the flat grooves 13 can achieve an improvement in the jet guidance, particularly for long tools 5, since the tangential velocity component, which the rotation of the tool holding body 2 during, operation causes the coolant to experience upon exiting from the flat grooves 13 into the surrounding region 19, is reduced by an opposing velocity component $\overline{v}$. It is thus possible to achieve an improved jet guidance.

With a helical curvature oriented in the same direction, it is advantageous for the emerging coolant exiting the flat grooves 13 to have an excess tangential velocity relative to the tool 5. Under certain circumstances, for example with relatively calm or relatively circulating ambient air, a better adhesion of the coolant jet to the tool 5 can be achieved because the ambient air must first slow the excess tangential velocity and at some distance from the front end 8, the tangential velocity of the coolant corresponds approximately to the tangential velocity of the outside of the tool shank. This can result in an improved adhesion of the jet to the tool.

Preferred values for the angle α lie between 1° and 60°, in particular between 5° and 45°.

Figures 7, 7A:
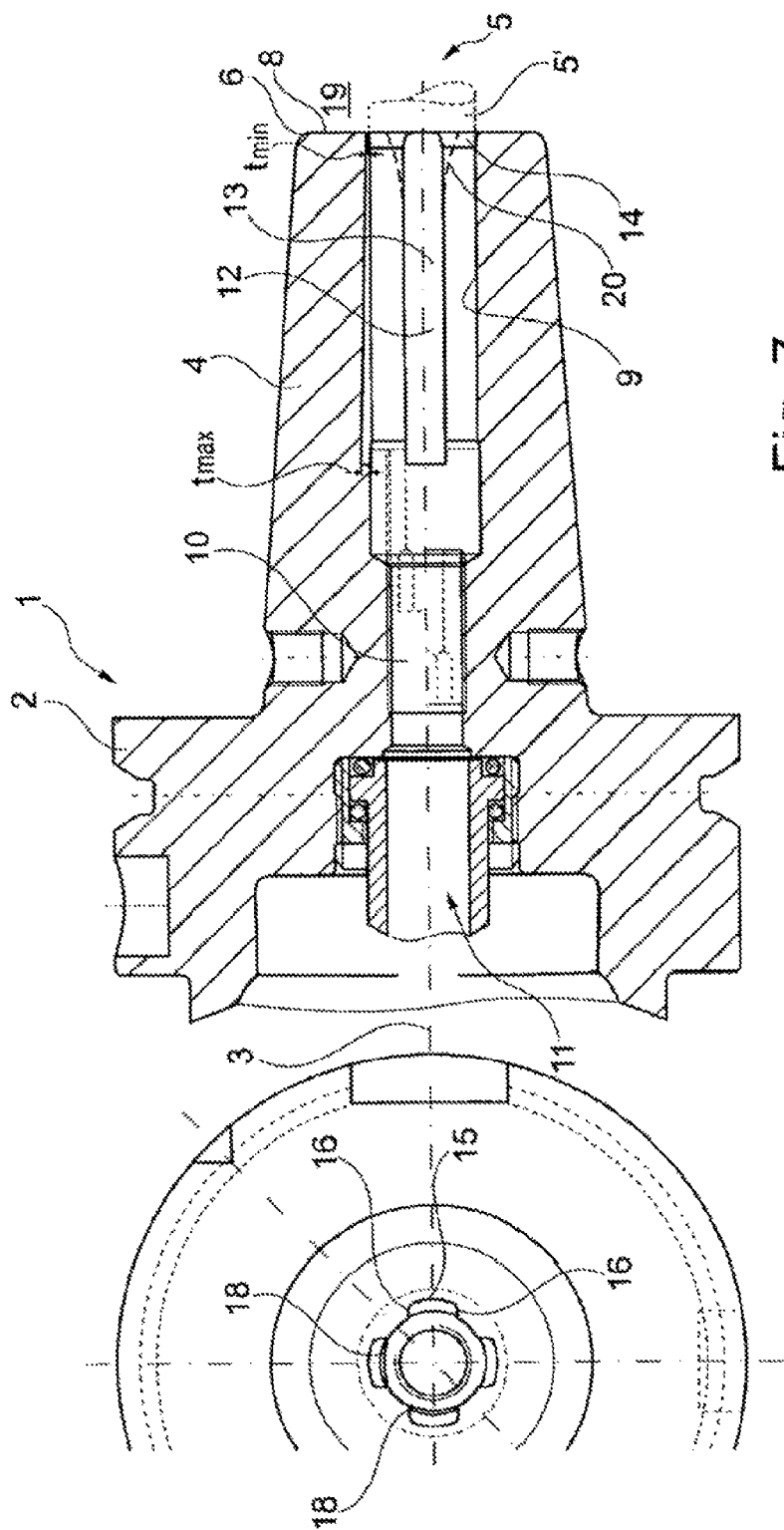
FIG. 7 is a partial longitudinal section through a seventh embodiment of the tool holding device according to the invention, embodied in the form of a shrink fit chuck.
FIG. 7a shows a tool holding device according to FIG. 7 in a top view of its front end oriented toward the insert tool.

In another embodiment of the tool holding device 1 according to the invention shown in FIGS. 7 and 7*a*, the flat grooves 13 have a depth t that decreases toward the free end 6 of the tool holding body 2. This causes the effective flow cross-section of the annular gap segments 17 or flow conduits 18 to narrow, resulting in an acceleration of the coolant fluid toward the free end 6 of the tool holding body 2. It is thus possible to achieve a jet bundling and better adhesion of the emerging coolant jet to the shank 5' of the tool 5 since in the region of the front end 8, the emerging jet has only a slight radial thickness. Also thanks to this measure, the individual coolant jets that exit the tool holding body 2 through the flow conduits 18 or the annular gap segments 17 unite better outside the tool holding body 2, thus producing a closed or essentially closed coolant envelope around the tool 5.

This can be further encouraged by embodying the grooves 13 so that their width b expands somewhat as they extend toward the free end 6, as indicated b the dashed line 20 in FIG. 7. As a result of this measure, adjacent jet edges at the outflow of coolant from the flow conduits 18 are situated closer to each other, thus increasing the probability that adjacent jets will unite.

It turns out to be particularly advantageous for a maximum depth $t_{max}$ to decrease along the groove toward the free end 6 to a value $t_{min}$, measured from the inner surface 9 of the receiving opening 7; preferably, $t_{min}$ is from one quarter the depth $t_{max}$ to two thirds the depth $t_{max}$.

According to another embodiment of the tool holding device 1 according to the invention (FIGS. 8 and 8*a*), a coolant reservoir and/or coolant collecting chamber 30 is provided, into which the coolant conveying devices 12, which are embodied as flat grooves 13, feed. The reservoir and/or collecting chamber 30 is situated inside the tool holding body 2 and is constituted by a circumferential annular groove 31, which extends a short distance radially out from the receiving opening 7. Viewed in the longitudinal direction of the tool holding body 2, the reservoir and/or collecting chamber 30 is situated in the vicinity of the outermost end region of the free end 6. The reservoir and/or collecting chamber 30 is separated from the free front end 8 by only an annular boundary rib 32. The reservoir and/or collecting chamber 30 transitions into the annular rib 32 via a conically tapering boundary wall 33. The annular boundary rib 32, together with the clamped tool 5, forms a narrow annular gap 34. The inner diameter of the annular boundary rib 32 is slightly greater than the outer diameter D of the tool shank 5'. This forms the very narrow annular gap 34 completely encompassing the tool shank 5' and coolant from the reservoir and/or collecting chamber 30 can travel through this gap between the tool shank 5' and the annular rib and out into the surrounding region. In particular, this produces a closed coolant envelope that completely encompasses the shank 5' as it extends away from the front end 8. The reservoir and/or collecting chamber 30 serves to unite the individual coolant flows that travel into the reservoir and/or collecting chamber 30 via the flat grooves 13. In a particularly advantageous embodiment, the reservoir and/or collecting chamber 30 is situated inside the tool holding body 2 since on the one hand, this enables a particularly simple, in particular one-piece manufacture of the tool holding body 2 and on the other, the reservoir and/or collecting chamber 30 does not present any interfering contours outside the outer contour of the tool holding body 2. It is thus possible to make particularly good use of the clamped tool 5. In particular, providing coolant conveying devices 12 in the form of flat grooves 13 as defined by the invention for supplying coolant to the reservoir and/or collecting chamber 30 permits the volume of this reservoir and/or collecting chamber to be kept small since the fact that the coolant is supplied in a wide swath means that only a small volume is required to produce a reliable uniting and swirling of the individual coolant flows from the flat grooves 13. It is thus possible to minimize the groove depth of the annular groove 31. Consequently, it is possible to minimize a weakening of the tool holding body 2 in its free end region 6. Providing only a radially small recess in the form of an annular groove 31 is sufficient to form a big enough reservoir and/or collecting chamber 30 of sufficient size.

Aside from the above-described details, this embodiment of the tool holding device 1 according to the invention does not otherwise differ from the embodiment according to FIGS. 2 and 2*a*.

In another embodiment of the tool holding device 1 according to the invention shown in FIGS. 9 and 9*a*, the reservoir and/or collecting chamber 30 is situated outside the tool holding body 2 and is delimited by the front end and the tool shank 5' on the one hand and by a cover element 40 on the other. The reservoir and/or collecting chamber 30 is thus situated after the front end 8 of the free end 6 of the tool holding body 2 in the axial, longitudinal direction, outside the tool holding body 2.

The cover element 40 is embodied for example in the form of a cap 42. The cap 42 has a cap top 43 in which an exit opening 41 is provided. The exit opening 41, together with the tool shank 5' of the tool 5, forms the annular gap 34. The cap 42 encompasses the free end 6 of the tool holding body 2 along its outer circumference and by means of a snap device 44, which can be embodied for example as a continuous snap ring or as a plurality of snap tabs, engages in snap fashion in an outer circumference groove 45, which is situated in the region of the clamping section 4, thus fixing the cover element 40 relative to the tool holding body 2 in both the axial and radial directions. In the region of the cap top 43, preferably an annular raised area 46 is provided, which extends a short way in the longitudinal direction from the cap top 43 toward the front end 8 and cooperates with the latter in a sealing fashion. This produces an annular gap with a short axial length, which constitutes the reservoir and/or collecting chamber 30.

Alternatively to the above-described flat grooves serving as a coolant conveying device 12, in this exemplary embodiment, a conduit 47 is provided as the coolant conveying device 12 and extends from a transverse bore 48 in the tool holding body 2 to the free front end 8, feeding into the reservoir and/or collecting chamber 30 there. The transverse bore 48 communicates with the transition bore 10 so that the reservoir and/or collecting chamber 30 can be supplied with coolant via the coolant supply device 11, the transverse bore 48, and the conduit 47, in this embodiment, the flat grooves 13 can be eliminated.

Figure 10:
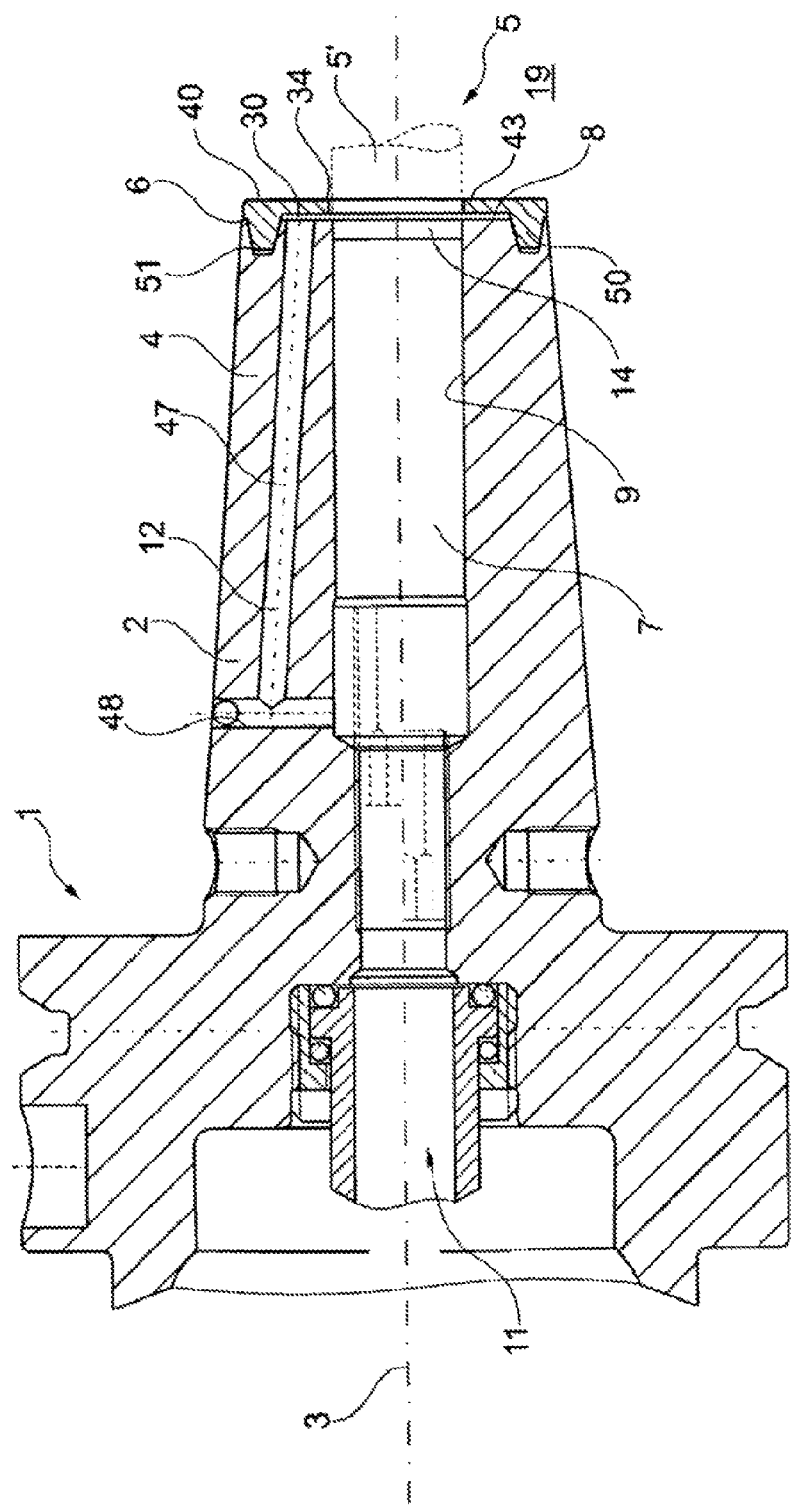
FIG. 10 is a partial longitudinal section through a tenth embodiment of the tool holding device according to the invention, embodied in the form of a shrink fit chuck.

FIG. 10 schematically depicts another exemplary embodiment of the tool holding device 1 according to the invention. This embodiment is essentially similar to the exemplary embodiment according to FIGS. 9 and 9*a*. Only the cover element 40 is embodied differently with regard to its attachment to the tool holding body.

So that the cover element 40 in this embodiment does not protrude beyond an outer circumference contour of the tool holding body 2, the cover element 40 has fastening devices 50 that cooperate with counterpart fastening devices 51 on the front end.

The fastening device 50 can, for example, be embodied in the form of a circumferential annular rib, which cooperates by means of a press-fit in the counterpart fastening device 51, which is embodied for example as a circumferential annular groove in the front end 8 of the tool holding body. Otherwise, the embodiment according to FIG. 10, in particular with respect to the embodiment of the coolant conveying devices 12 and the formation of the annular gap 34 and the reservoir and/or collecting chamber 30, is comparable to the embodiment according to FIGS. 9 and 9a.

Figure 11:
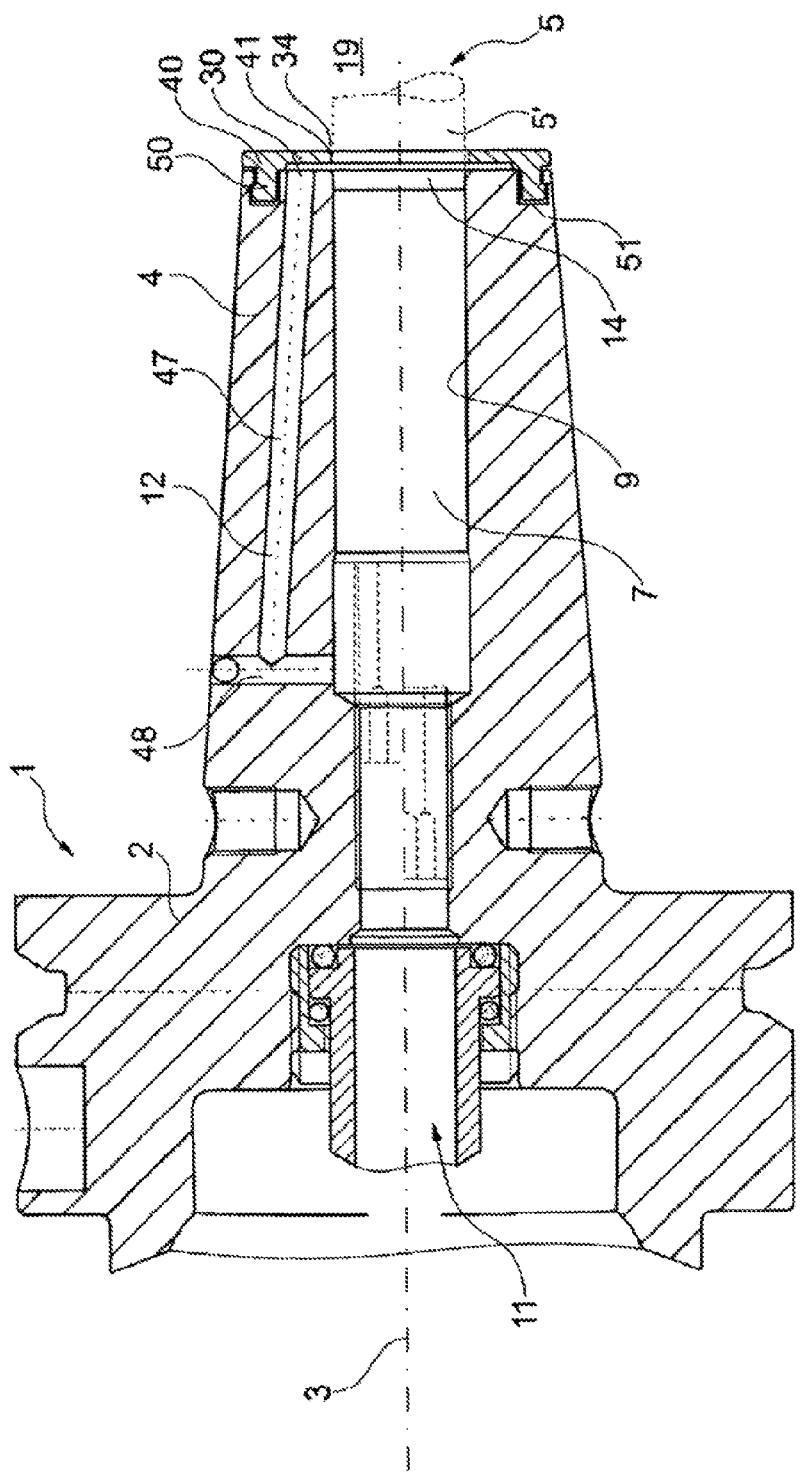
FIG. 11 is a partial longitudinal section through an eleventh embodiment of the tool holding device according to the invention, embodied in the form of a shrink fit chuck.

In another embodiment of the tool holding device 1 according to the invention shown in FIG. 11, the fastening devices 50 and counterpart fastening devices 51 are embodied in the form of snap devices and counterpart snap devices; in this case, as in the embodiment according to FIG. 10, it is particularly advantageous that the cover element 40 does not protrude radially beyond the outer contour of the tool holding body 2.

Figure 12:
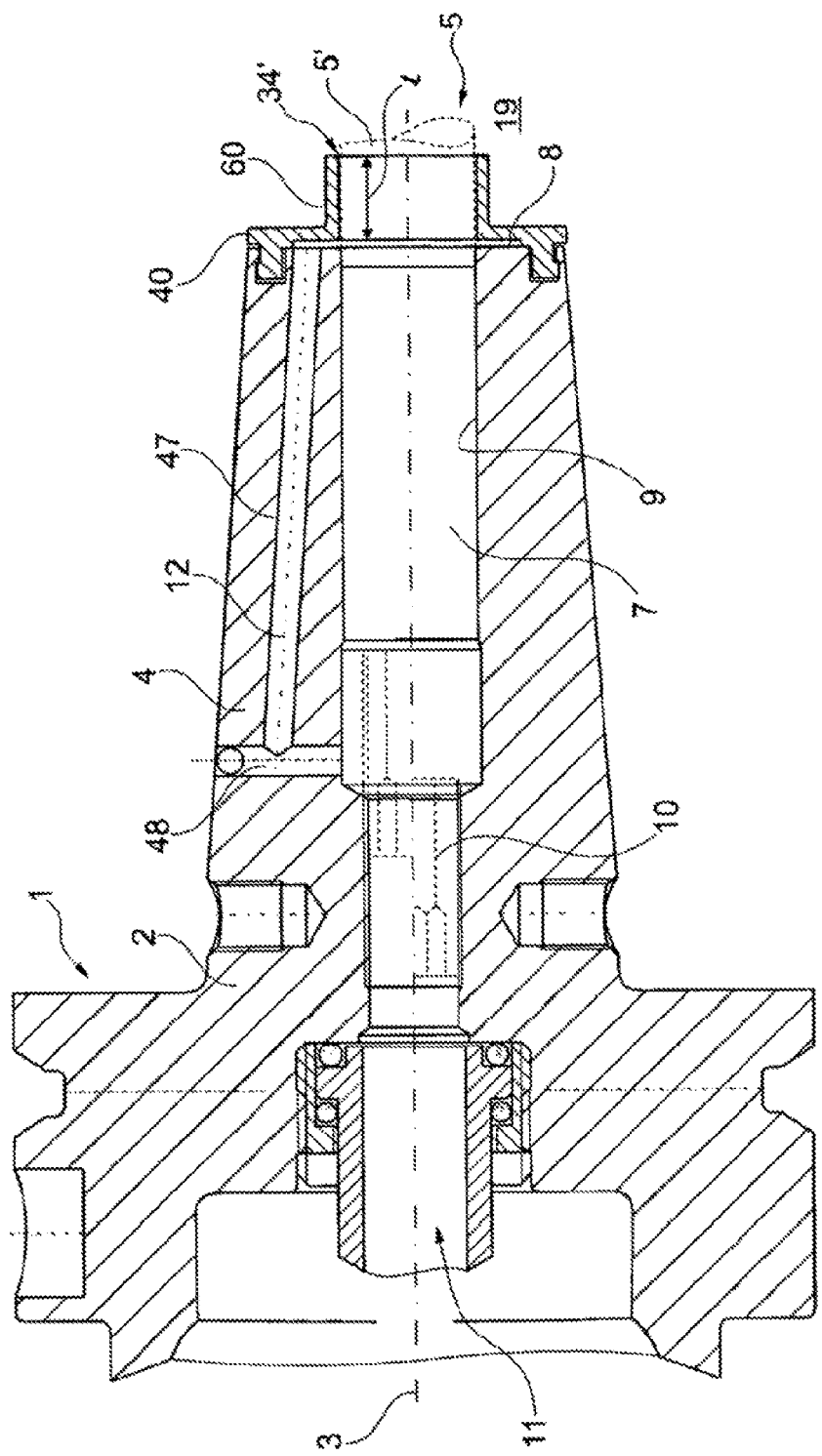
FIG. 12 is a partial longitudinal section through a twelfth embodiment of the tool holding device according to the invention, embodied in the form of a shrink fit chuck.

The embodiment according to FIG. 12 corresponds essentially to the embodiment according to FIG. 11; the cover element additionally has a jet-forming collar 60 that extends axially from the cover element 40, extending a short distance away from the front end 8. The jet-forming collar 60 has an effective length 1 and encompasses the tool shank 5' forming a jet-forming conduit 34' with the length 1.

Preferably, the ratio of the axial length 1 of the jet-forming annular conduit 34' to the tool shank diameter D lies in the range between 0.2:1 and 1:1, in particular in the range between 0.3:1 and 0.8:1, and particularly preferably in the range from 0.4:1 to 0.7:1.

Providing a jet-forming annular conduit 34' constituted by a Jet-forming collar 60 achieves a particularly uniform embodiment of the coolant envelope around the tool shank 5'. This also reduces the tendency of the coolant envelope to mushroom after the coolant has exited the jet-forming annular conduit 34'.

The above-indicated ratio ranges between the tool shank diameter D and the axial length 1 of the jet-forming annular conduit 34' represent a good compromise between good jet quality and a still acceptable change in the outer contour of the tool holding body 2 so that the tool can still be used in the most optimal possible fashion without the risk of collisions in the programming, for example of milling programs.

Naturally, the concept of providing a jet-forming collar 60 can easily be transferred to the embodiments of the tool holding device 1, in particular the ones according to FIGS. 9, 9a, 10, and 11, and also to the embodiment variants described below. The jet-forming collar 60 has only been shown in connection with a cover element 40 equipped with fastening devices 50, 51 according to the embodiment in FIG. 11 for illustration purposes.

Figure 13:
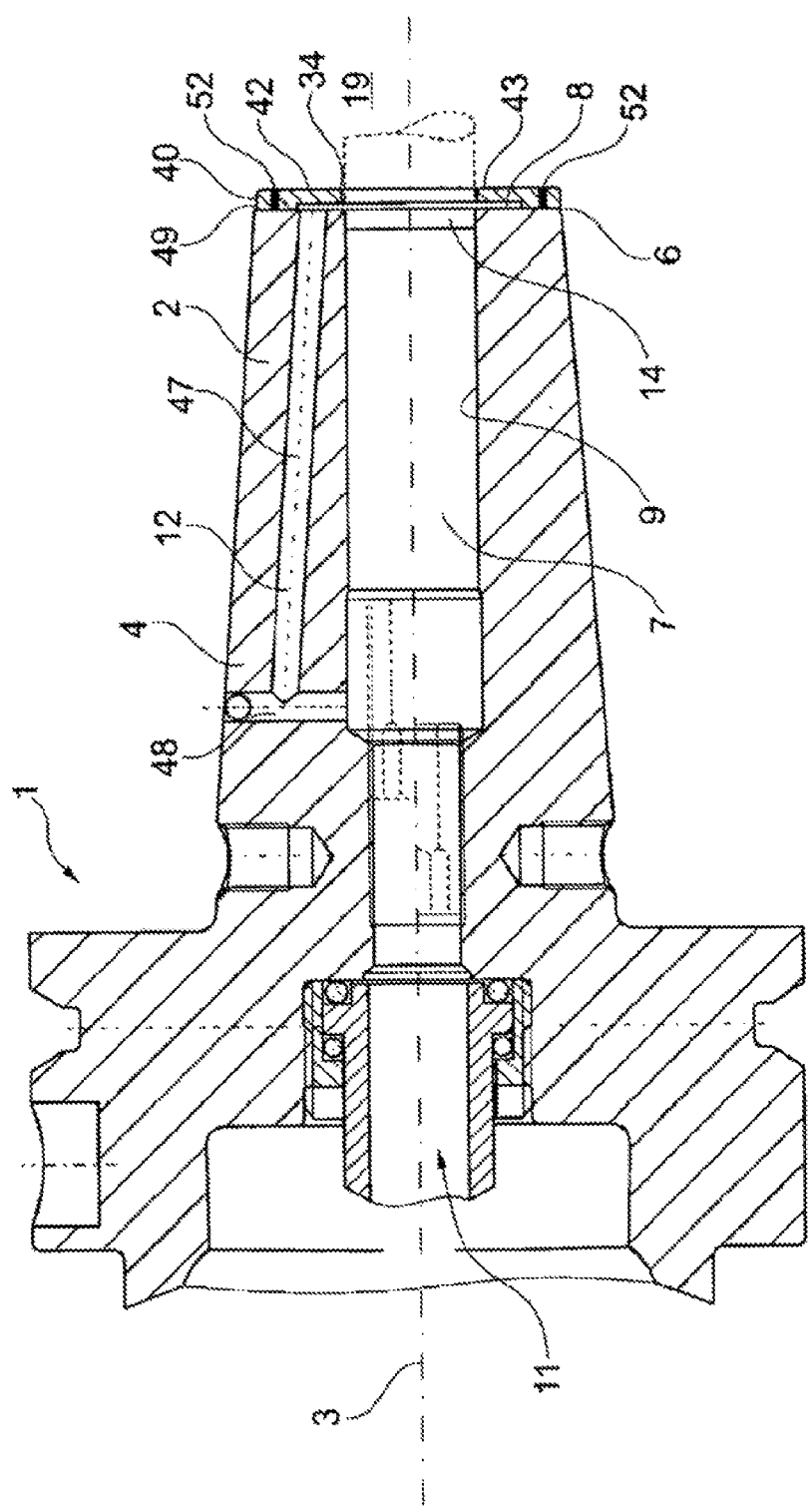
FIG. 13 is a partial longitudinal section through a thirteenth embodiment of the tool holding device according to the invention, embodied in the form of a shrink fit chuck.

In another embodiment of the tool holding device 1 according to the invention (FIG. 13), the cover element 40 is likewise embodied in the form of a cap 42. The cap 42 has a thickened ring 49 extending around its peripheral edge so that the cap top 43 is spaced axially apart from the front end 8, thus forming the reservoir and/or collecting chamber 30. In this embodiment, the cap 42 also has bores 52 for fastening purposes, by means of which the cap 42 is welded to the tool holding body 2. Naturally, a peripheral welding seam can also be provided. Apart from this, the embodiment according to FIG. 13 corresponds to the embodiments according to FIGS. 10 and 11. Naturally, the cap 42 can also have a jet-forming collar formed onto it, as described in conjunction with FIG. 12.

Figure 14:
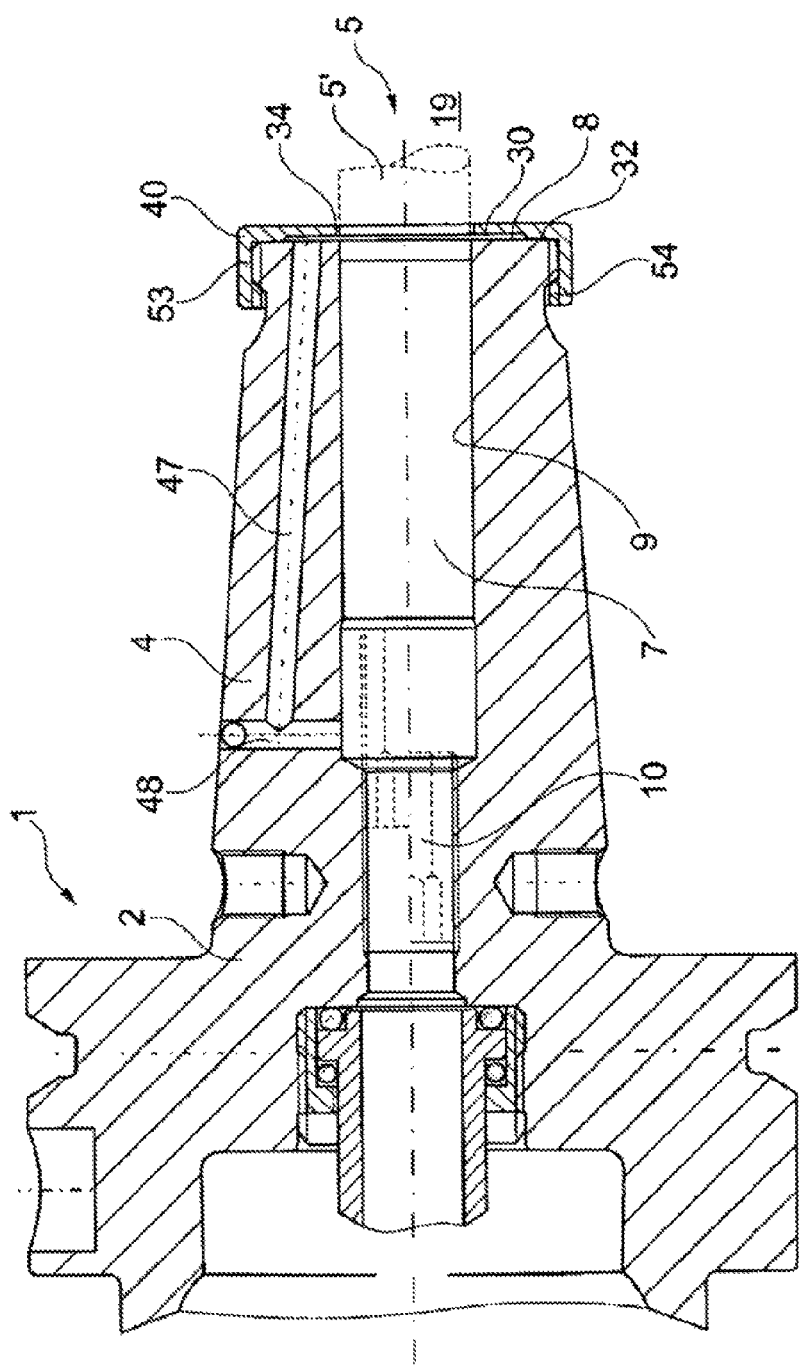
FIG. 14 is a partial longitudinal section through a fourteenth embodiment of the tool holding device according to the invention, embodied in the form of a shrink fit chuck.

In the embodiment according to FIG. 14, the cover element 40 is embodied in the form of a clamping nut with a female thread 53, which cooperates with a male thread 54 on the tool holding body 2. The annular raised area 46, which cooperates with the front end 8, is provided for sealing the reservoir and/or collecting chamber 30.

The embodiments of the tool holding device 1 according to the invention described below (FIGS. 15 through 21a) are embodiments in which the reservoir and/or collecting chamber 30 is situated inside the tool holding body 2 and is delimited in the radial direction essentially by the internal bevel 14. This means that inside the conical expansion of the receiving opening 7 in the region of the internal bevel 14, an essential portion of the volume of the reservoir and/or collecting chamber 30 is constituted by the internal bevel 14. By contrast with this, the reservoir and/or collecting chamber 30 in the embodiment according to FIG. 8 is essentially constituted by the annular groove 31. In the embodiments according to FIGS. 9 through 14, essentially the largest part of the volume of the reservoir and/or collecting chamber 30 is delimited by the cover element 40 and the front end 8 of the tool holding body. The essential volumes of the reservoir and/or collecting chambers 30 in these embodiments are thus situated outside the tool holding body 2.

In a first embodiment of this type (FIG. 15) of the tool holding device 1, the cover element 40 is mounted onto the front end 8 of the tool holding body 2 by means of welding. The cover element 40 is embodied in the form of a flat, perforated disc and has the exit opening 41. The inclination of the internal bevel 14 is arranged so that the largest diameter is situated immediately adjacent to the front end 8 and this diameter is slightly greater than the inner diameter of the exit opening 41 so that an annular edge 55 of the cover element protrudes a short distance radially into the beveled region of the receiving bore 7, thus constituting a retaining edge or collecting edge for coolant fluid contained in the region of the internal bevel 14. Apart from this, the inner diameter of the exit opening 41 relative to the tool shank 5' of the tool 5 is embodied as described above. This once again ensures the formation of the annular gap 34 in the manner described above.

This embodiment has the particular advantage that the cover element protrudes only a very short distance axially beyond the outer contour of the tool holding body so that virtually the entire length of the tool 5 remains usable. Nevertheless, the internal bevel 14 and the cover element 40 effectively form a reservoir and/or collecting chamber 30 that is supplied with coolant fluid via the flat grooves 13. This embodiment is particularly easy to manufacture and in particular, permits an embodiment according to FIGS. 1 through 7 to be retrofitted with a reservoir and/or collecting chamber 30. It is thus possible to achieve a favorable result with regard to the jet formation and the closed coolant envelope around the tool 5.

In another embodiment of the tool holding device 1 according to the invention, a flat recess 56 is provided in the front end 8 of the tool holding body 2 and accommodates the cover element 40 in a recessed fashion. As a result, the cover element 40 does not alter the outer contour of the tool holding body 2 (see FIG. 16, 16a, and 16b).

The flat recess 56 is embodied as essentially trapezoidal in cross-section and tapers toward the front end 8, thus forming an undercut edge 57. In a corresponding fashion, the cover element 40 (FIGS. 17 and 17a) is embodied in the form of a flat, perforated disc and has a beveled outer edge 58 that corresponds to the undercut of the flat recess 56. The cover element has the exit opening 41 so that the annular gap 34 is produced between the tool shank 5' and the exit opening 41. A retaining and/or collecting, edge 55, together with the internal bevel 14, delimits the reservoir and/or collecting chamber 30. In order to mount the cover element 40 of this embodiment, the cover element 40 is arched like a disc spring and in the arched state, is inserted past the undercut edge 57 into the flat recess 56. Then the elastic prestressing can be released so that the cover element 40 rests in the recess 56, optionally with a residual spring prestressing, and is thus fixed in place both radially and axially. In a suitable embodiment, the cover element 40 is provided with mounting bores 59 distributed around the circumference, into which pins can be inserted; the elastic prestressing and elastic arching can be produced by moving the pins radially toward one another.

Another embodiment of the tool holding device 1 according to the invention shown in FIGS. 18, 18a, 18b, 19, and 19a corresponds essentially to embodiment according to FIGS. 15 and 15a; in this case, the cover element is fastened to the front end 8 of the tool holding body 2 by means of a screw connection. In this embodiment, the cover element 40 likewise has a retaining and/or collecting edge 55, which delimits the reservoir and/or collecting chamber 30. An annular gap 34 is formed between the tool shank 5 and the cover element.

The screw connection is preferably embodied by means of countersunk-head screws 61 since these end flush with an outside of the perforated disc, thus preventing the formation of an interfering contour.

Another embodiment of the tool holding device 1 according to the invention shown in FIGS. 20 through 21a also has a flat recess 56 at the front end into which the cover element 40 is fastened. By contrast with the cover element 40 according to the embodiment in FIGS. 16 through 17a, the cover element in this embodiment has a jet-forming collar 60 whose axial length 1 is selected so that the jet-forming collar 60 extends a short distance beyond the front end 8 of the tool holding body 2. The cover element 40 also has a retaining and/or collecting edge 55 for delimiting the reservoir and/or collecting chamber 30, which is delimited radially by the internal bevel 14. The cover element 40 is equipped with the exit opening 41 so that a jet-forming conduit 34' is produced. At the bottom of the flat recess 56, close to the receiving opening 7, an annular ridge 63 surrounding the opening is provided, which the cover element 40 rests against in the axial direction.

The flat recess is equipped with the undercut edge 57. In addition, the cover element 40 is provided with locking tabs 66. The flat recess and the cover element 40 can thus be connected in rotating bayonet fashion.

Figure 22:
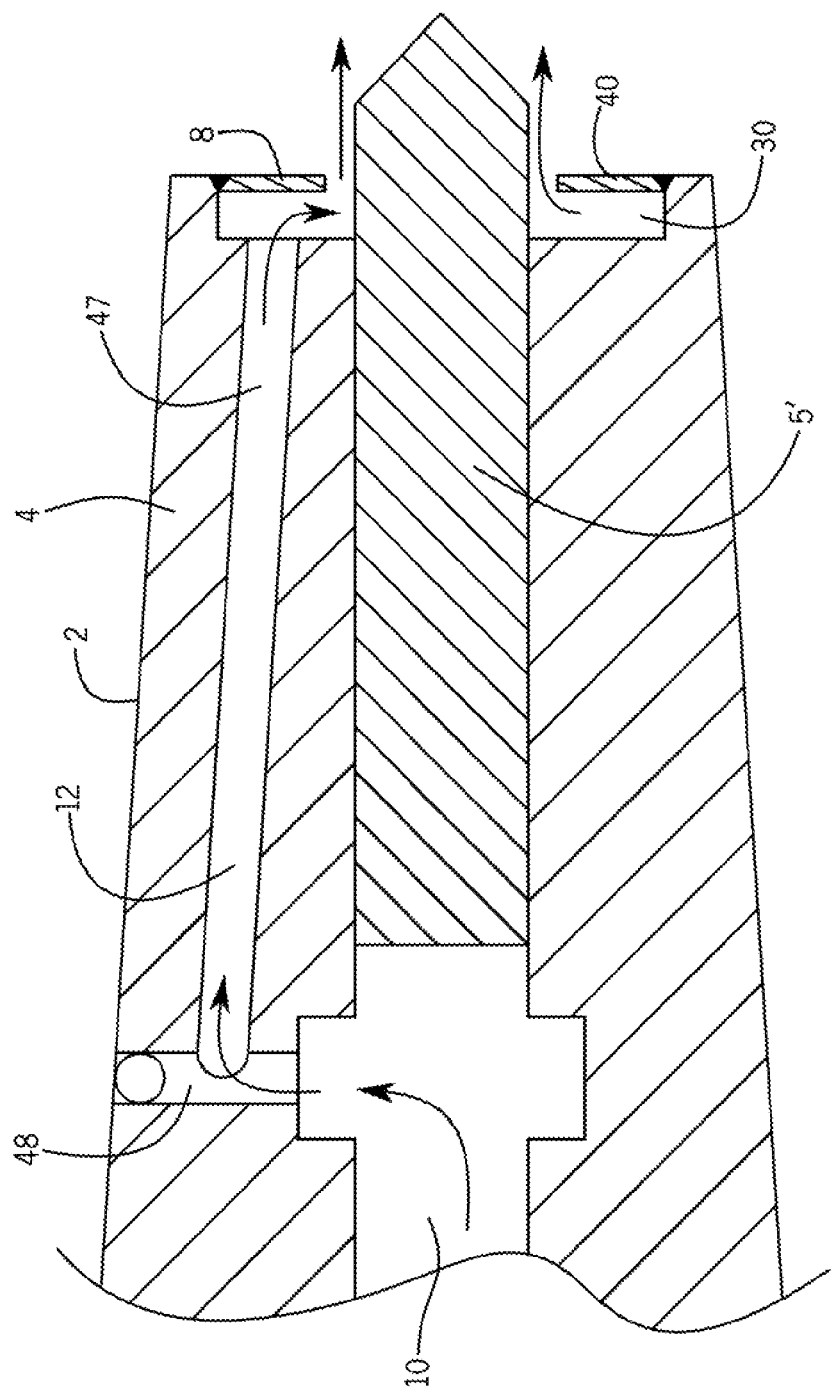
FIG. 22 is a partial longitudinal section through yet another embodiment of the tool holding device according to the invention, embodied in the form of a shrink fit chuck.

Yet another embodiment of the tool holding device 1 according to the invention is shown in FIG. 22. In this embodiment, the tool holding body 2 is a shrink fit chuck. The clamping section 4 and the receiving opening 7 support the shank 5' of the tool. The coolant supply device 11 provides pressurized coolant. At least one coolant conveying device 12 conveys the coolant to the clamped tool shank 5', and a region of a free end of the tool holding body 2 is provided with the coolant reservoir and/or coolant collecting chamber 30 into which the at least one coolant conveying device 12 feeds. The coolant reservoir and/or coolant collecting chamber 30 is connected to a region surrounding the tool holding device 1 at a free end of the tool holding body 2 via an annular gap. The annular gap at the coolant reservoir and/or coolant collecting chamber 30 is at least partially delimited by the tool shank 5'. The coolant conveying device 12 is designed as a conduit 47 that extends from a cross bore 48 in the tool holding body 2, which is interconnected with a transition bore 10 in the center of the tool holding body 2, to a front end 8 of the tool holding body 2 where the conduit 47 is interconnected with the coolant reservoir and/or the coolant collecting chamber 30. The cover element 40 may have an exit opening, which, together with the tool, forms the annular gap. The reservoir and/or coolant collecting chamber 30 may be situated outside the exit opening and may be at least partially delimited by the free front end 8 of the tool holding body 2. Alternatively, the reservoir and/or coolant collecting chamber 30 may be situated inside the receiving opening, at least partially delimited by an internal bevel and the cover element 40.

As described above with respect to other embodiments, the cover element 40 may be embodied in the form of a cap, which engages in snap fashion in an outer circumference groove on the tool holding body 2. The cover element 40 may have an elastic snap ring or a plurality of elastic snap tabs. More particularly, the cover element 40 may have a fastening device embodied in the form of a retaining ring or a plurality of retaining pins, which is/are supported in corresponding counterpart fastening devices in the front end of the tool holding body. Alternatively, the cover element 40 may have a fastening device in the form of a snap fastening device, which cooperates with corresponding counterpart snap devices in the front end 8 of the tool holding body 2. The cap 42 can also have a jet-forming collar formed onto it, as described in conjunction with FIG. 12.

In certain embodiments, such as the embodiment shown in FIG. 22, the coolant conveying device 12 is designed as a conduit 47 that extends from the cross bore 48 in the tool holding body 2, which is interconnected with the transition bore 10 in the center of the tool holding body 2, to the front end 8 of the tool holding body 2 covered by a cover element and is interconnected with the coolant reservoir and/or the coolant collecting, chamber 30. The annular gap and coolant reservoir and/or coolant collecting chamber 30 may be at least partially delimited by the tool shank 5' and is formed with participation of the cover element 40, which is accommodated in a recessed fashion in a recess in the front end 8 of the tool holding body 2. The cover element may end radially flush with an outer contour of the tool holding body or may be embodied as radially recessed relative to the outer contour. The covet element may be beveled at an edge of the cover element and rest in a corresponding undercut recess in the tool holding body. Additionally or alternatively, the cover element may rest in a recess in an elastically prestressed fashion. The cover element may be fastened in rotating bayonet fashion in a recess at the front end 8 of the tool holding body 2 or the cover element may be welded to the front end 8 of the tool holding body 2.

The present invention discloses a multitude of options for influencing jets and guiding coolant, making it possible to achieve a closed or essentially closed coolant envelope around a material-removing machining tool that is held in the tool holding device.

For the person of average skill in the art, it is clear that features described separately in conjunction with individual exemplary embodiments can easily be transferred to other exemplary embodiments or combined with features of other exemplary embodiments. It is also clear to the person of average skill in the art that the features described in detail in conjunction with the exemplary embodiments that have been described in the context of a shrink fit chuck can likewise be transferred to a flat chuck embodied in the form of a Weldon chuck or whistle-notch chuck or can be combined with their typical embodiment features. The same applies to transferring the above-described features to collet chucks such as ER collet chucks, OZ collet chucks, or high-precision collet chucks.

The invention claimed is:

1. A tool holding device, comprising:
a tool holding body for co-rotationally securing a rotating tool with a shank, wherein the tool holding body is a shrink fit chuck;
a clamping section and a receiving opening for the shank of the tool;
a coolant supply device for pressurized coolant; and
at least one coolant conveying device for conveying the coolant to the clamped tool shank, wherein a region of a free end of the tool holding body is provided with a coolant reservoir and/or coolant collecting chamber into which the at least one coolant conveying device feeds;
the coolant reservoir and/or coolant collecting chamber is situated inside the tool holding body in a vicinity of an outermost end region of a free end, viewed in a longitudinal direction of the tool holding body, and is constituted by a circumferential annular groove which extends a short distance radially out from the receiving opening; the coolant reservoir and/or coolant collecting chamber is connected to a region surrounding the tool holding device at a free end of the tool holding body via an annular gap, and the coolant reservoir and/or coolant collecting chamber is at least partially delimited by the tool shank and by a cover element;
a flat recess is provided in a front end of the tool holding body and accommodates the cover element in a recessed fashion, as a result the cover element does not alter an outer contour of the tool holding body;
the cover element ends radially flush with an outer contour of the tool holding body and the cover element is welded to the front end of the tool holding body; and
the annular gap at the coolant reservoir and/or coolant collecting chamber is at least partially delimited by the tool shank;
wherein the coolant conveying device is designed as a conduit which extends from a cross bore in the tool holding body which is interconnected with a transition bore in a center of the tool holding body, to the front end of the tool holding body where the conduit is interconnected with the coolant reservoir and/or the coolant collecting chamber.

2. The tool holding device as recited in claim 1, wherein the cover element has an exit opening, which, together with the tool, forms the annular gap.

3. The tool holding device as recited in claim 2, wherein the reservoir and/or collecting chamber is situated outside the exit opening and is at least partially delimited by the free front end of the tool holding body.

4. The tool holding device as recited in claim 1, wherein the cover element has a fastening device embodied in the form of a retaining ring or a plurality of retaining pins, which is/are supported in corresponding counterpart fastening devices in the front end of the tool holding body.

5. The tool holding device as recited in claim 1, wherein the cover element has a jet-forming collar so that a jet-forming annular conduit with a length is formed.

6. The tool holding device as recited in claim 5, wherein a ratio of the axial length of the jet-forming annular conduit to a tool shank diameter lies in a range between 0.2:1 and 1:1.

7. The tool holding device as recited in claim 1, wherein the reservoir and/or collecting chamber is situated inside the receiving opening and is at least partially delimited by an internal bevel and the cover element.

8. A tool holding device as recited in claim 1, wherein the coolant conveying device is designed as a conduit, which extends to the front end of the tool holding body covered by the cover element and is interconnected with the coolant reservoir and/or the coolant collecting chamber.

9. The tool holding device as recited in claim 8, wherein the annular gap and coolant reservoir and/or coolant collecting chamber are at least partially delimited by the tool shank and is formed with participation of the cover element, which is accommodated in a recessed fashion in a recess in the front end of the tool holding body.

10. The tool holding device as recited in claim 8, wherein the cover element is beveled at an edge of the cover element and rests in a corresponding undercut recess in the tool holding body.

11. The tool holding device as recited in claim 8, wherein the cover element rests in a recess in an elastically pre-stressed fashion.

* * * * *